US011874619B2

(12) United States Patent
Noda

(10) Patent No.: US 11,874,619 B2
(45) Date of Patent: Jan. 16, 2024

(54) IMAGE FORMING APPARATUS AND CONTROL METHOD THEREOF

(71) Applicant: BROTHER KOGYO KABUSHIKI KAISHA, Nagoya (JP)

(72) Inventor: Daisuke Noda, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/938,060

(22) Filed: Oct. 5, 2022

(65) Prior Publication Data

US 2023/0123219 A1 Apr. 20, 2023

(30) Foreign Application Priority Data

Oct. 15, 2021 (JP) ................................. 2021-169306
Jun. 6, 2022 (JP) ................................. 2022-091551

(51) Int. Cl.
*G03G 15/20* (2006.01)
*G03G 15/00* (2006.01)

(52) U.S. Cl.
CPC ....... *G03G 15/205* (2013.01); *G03G 15/2064* (2013.01); *G03G 15/5045* (2013.01); *G03G 2215/2038* (2013.01)

(58) Field of Classification Search
CPC ......... G03G 15/2064; G03G 15/21045; G03G 15/205
USPC .......................................................... 399/69
See application file for complete search history.

(56) References Cited

FOREIGN PATENT DOCUMENTS

| | | | | |
|---|---|---|---|---|
| JP | 7-114296 A | | 5/1995 | |
| JP | 2020-20988 A | | 2/2020 | |
| JP | 2020-52377 A | | 4/2020 | |
| JP | 7126884 B2 | * | 8/2022 | ......... G03G 15/2039 |

OTHER PUBLICATIONS

Computer translation of Mita, JP7126884B2, filed Aug. 2022.*

* cited by examiner

*Primary Examiner* — Quana Grainger
(74) *Attorney, Agent, or Firm* — Merchant & Gould P.C.

(57) ABSTRACT

An image forming apparatus includes a toner image forming unit, a fuser including a heater, a temperature sensor that detects a temperature of the fuser, and a controller. The controller exercises a standby control that includes repeating a control cycle, measuring a temperature fluctuation period that is a time period from start of energizing the heater to an end of the control cycle, and setting an energization amount for a next control cycle, based on the measured temperature fluctuation period. The control cycle includes energizing the heater with an energization amount during a preset heating period when the detection temperature has dropped to a temperature below the target standby temperature, and waiting until the detection temperature drops to the target standby temperature in a case where the detection temperature has risen to a temperature equal to or above the target standby temperature after the preset heating period has elapsed.

20 Claims, 14 Drawing Sheets

FIG.9

| HEATING INTENSITY VARIABLE j | DUTY RATIO |
|---|---|
| 1 | 33% |
| 2 | 40% |
| 3 | 43% |
| 4 | 50% |
| 5 | 57% |
| 6 | 60% |
| 7 | 67% |
| 8 | 100% |

IMAGE FORMING APPARATUS AND CONTROL METHOD THEREOF

REFERENCE TO RELATED APPLICATIONS

This application claims priority from Japanese Patent Application No. 2021-169306 filed on Oct. 15, 2021 and Japanese Patent Application No. 2022-091551 filed on Jun. 6, 2022. The entire contents of the priority applications are incorporated herein by reference.

BACKGROUND ART

An image forming apparatus conventionally known in the art includes a fuser configured to fix a toner image on a sheet. The fuser comprises a heater. During standby of the fuser, energization to the heater is started when a detection temperature of the fuser is equal to or below a lower temperature limit, and energization to the heater is stopped when the detection temperature of the fuser reaches an upper temperature limit.

According to one example of such conventional art, a de-energization time period is provided after energization to the heater. If a detection temperature drops below a lower temperature limit in the de-energization time period, an upper temperature limit is raised, and if the detection temperature as determined upon lapse of the de-energization time period is above the lower temperature limit, the upper temperature limit is lowered.

According to another example of such conventional art, when a detection temperature drops to a temperature below a lower temperature limit, a duty ratio of a heater is determined according to a difference between an upper temperature limit and the detection temperature. If a detected peak temperature is above a target peak temperature, the next duty ratio is made smaller than the present duty ratio. If the detected peak temperature is below the target peak temperature, the next duty ratio is made greater than the present duty ratio.

DESCRIPTION

Generally, a temperature of a heater deviates greatly from a temperature of a fuser. The "temperature of the fuser" herein varies with a position of a temperature sensor provided in the fuser and is, for example, a temperature of a surface of a heating roller. The temperature of the heater becomes much higher than the temperature of the fuser when the heater is energized, and comes closer to the temperature of the fuser after energization to the heater is stopped. Therefore, even if energization to the heater is stopped based on the fact that a detection temperature of the temperature sensor provided in the fuser has reached an upper temperature limit, the detection temperature of the temperature sensor rises due to residual heat of the heater, and then gradually drops. The peak temperature of the fuser at this point in time varies depending on, for example, heat accumulated in the fuser and components around the fuser, ambient environment, etc. Thus, if the peak temperature becomes high, it takes a long time for the detection temperature to drop to the lower temperature limit. As time elapses after energization to the heater is stopped, the heater temperature drops, and as the heater temperature drops, electrical resistance of the heater decreases. If a long time elapses until the detection temperature reaches the lower temperature limit after energization to the heater is stopped, the heater temperature drops to a temperature that is too low.

As a result, electrical resistance of the heater decreases which causes a large inrush current flowing through the heater the next time the heater is energized. The increase in inrush current leads to problems such as generation of flicker and power supply/voltage noise.

It would be desirable to keep a de-energization time period of the heater from becoming too long when the fuser is maintained in a standby state.

In one aspect, an image forming apparatus disclosed herein comprises a toner image forming unit, a fuser, a temperature sensor, and a controller. The toner image forming unit is configured to form a toner image on a sheet. The fuser comprises a heater and is configured to fix the toner image onto the sheet. The temperature sensor detects a temperature of the fuser. The controller exercises a standby control under which the temperature of the fuser is maintained within desired limits at temperatures around a target standby temperature, based on a detection temperature detected by the temperature sensor.

The standby control comprises, repeating a control cycle, measuring a temperature fluctuation period that is a time period from start of energizing the heater to an end of the control cycle, and setting an energization amount $E_{n+1}$ for a next control cycle, based on the measured temperature fluctuation period. The control cycle includes energizing the heater with an energization amount $E_n$ during a preset heating period in a case where the detection temperature has dropped to a temperature below the target standby temperature, and waiting until the detection temperature drops to the target standby temperature in a case where the detection temperature has risen to a temperature equal to or above the target standby temperature after the preset heating period has elapsed. In a case where the temperature fluctuation period of a last control cycle is shorter than a first threshold, the energization amount $E_{n+1}$ is set at an amount greater than an energization amount $E_n$ for the last control cycle. In a case where the temperature fluctuation period of the last control cycle is equal to or longer than a second threshold greater than the first threshold, the energization amount $E_{n+1}$ is set at an amount smaller than the energization amount $E_n$ for the last control cycle. In a case where the temperature fluctuation period of the last control cycle is equal to or longer than the first threshold and shorter than the second threshold, the energization amount $E_{n+1}$ is set at a same amount as the energization amount $E_n$ for the last control cycle.

In another aspect, a control method for an image forming apparatus is disclosed. The image forming apparatus comprises a toner image forming unit, a fuser, and a controller. The toner image forming unit is configured to form a toner image on a sheet. The fuser comprises a heater and is configured to fix the toner image onto the sheet. The controller exercises a standby control under which a temperature of the fuser is maintained within desired limits at temperatures around a target standby temperature.

The standby control comprises repeating a control cycle, measuring a temperature fluctuation period that is a time period from start of energizing the heater to an end of the control cycle, and setting an energization amount $E_{n+1}$ for a next control cycle, based on the measured temperature fluctuation period. The control cycle includes energizing the heater with an energization amount $E_n$ during a preset heating period in a case where the temperature of the fuser has dropped to a temperature below the target standby temperature, and waiting until the temperature of the fuser drops to the target standby temperature in a case where the temperature of the fuser has risen to a temperature equal to or above the target standby temperature after the preset heating period has elapsed. In a case where the temperature fluctuation period of a last control cycle is shorter than a first threshold, the energization amount $E_{n+1}$ is set at an amount greater than an energization amount $E_n$ for the last control cycle. In a case where the temperature fluctuation period of the last control cycle is equal to or longer than a second threshold greater than the first threshold, the energization amount $E_{n+1}$ is set at an amount smaller than the energization amount $E_n$ for the last control cycle. In a case where the temperature fluctuation period of the last control cycle is equal to or longer than the first threshold and shorter than the second threshold, the energization amount $E_{n+1}$ is set at a same amount as the energization amount $E_n$ for the last control cycle.

According to the above-described configurations, as the control cycle is repeated, the amount of energization to the heater will be adjusted to an appropriate amount so that the temperature fluctuation period of one control cycle comes closer to a time period equal to or longer than the first threshold CT1 and shorter than the second threshold CT2. As a result, the de-energization time period of the heater can be kept from becoming too long. Thus, inrush current flowing through the heater upon energizing the heater can be kept from becoming too large. Further, when the control cycle becomes excessively short, a long term flicker perceptibility (Plt) may get worse. However, according to the above-described configurations, since the temperature fluctuation period of one control cycle comes closer to the time period equal to or longer than the first threshold CT1 and shorter than the second threshold, the long term flicker perceptibility can be kept from becoming worse.

The controller may configured to execute the standby control, after lapse of the heating period, in such a manner that in a case where the temperature of the fuser upon lapse of a predetermined time period from start of the heating period is below the target standby temperature, energization to the heater is started for the next control cycle in which the energization amount $E_{n+1}$ is set at an amount greater than the energization amount $E_n$ for the last control cycle.

According to this configuration, after lapse of the heating period, even when the temperature of the fuser does not rise to a temperature equal to or above a target standby temperature upon lapse of a predetermined time period from start of the heating period due to the ambient temperature being extremely low, the temperature of the fuser can be adjusted to a temperature closer to the target standby temperature.

The controller may be configured to change the heating period to a time period longer than the heating period of the last control cycle in a case where the energization amount is adjusted to a greater amount, and to change the heating period to a time period shorter than the heating period of the last control cycle in a case where the energization amount is adjusted to a smaller amount.

In this case, the controller may be configured to control energization to the heater during the heating period by a wave number control scheme wherein the energization amount is adjusted by changing the number of times of repeating a predetermined energization pattern of the wave number control scheme.

The controller may be configured to provide a preheating period before the heating period of the next control cycle, in a case where the temperature fluctuation period of the last control cycle is equal to or longer than a third threshold greater than the second threshold, wherein the heater is energized during the preheating period with a first heating intensity, and then energized during the heating period with a second heating intensity greater than the first heating intensity.

According to this configuration, even if the temperature fluctuation period becomes longer, and the temperature of the heater drops, the heater is energized with a first heating intensity smaller than a heating intensity with which the heater is energized during the heating period of the last control cycle, and then is energized with a second heating intensity greater than the first heating intensity. Thus, a relatively small amount of energization is applied to the heater having a decreased electrical resistance due to a decrease in temperature. In this way, the temperature of the heater H1 gradually increases, and thus inrush current flowing through the heater upon start of energization to the heater can be kept from becoming too large.

When the preheating period is provided, the controller may be configured to control energization to the heater during the heating period under a wave number control scheme, and to control energization to the heater during the preheating period under a phase control scheme.

The controller may be configured to energize the heater during the heating period at a preset duty ratio wherein in a case where the energization amount is adjusted to a greater amount, the duty ratio is adjusted to a ratio above a duty ratio for the heating period of the last control cycle, and in a case where the energization amount is adjusted to a smaller amount, the duty ratio is adjusted to a ratio below the duty ratio for the heating period of the last control cycle.

In this way, the energization amount during the heating period can also be changed by adjusting the duty ratio.

In a case where standby control is started for the first time after power to the image forming apparatus is turned on, it is preferable to set an initial energization amount for the heating period of the control cycle at a minimum permissible amount.

According to this configuration, since an excessive amount of heat is not supplied to the fuser, the de-energization time period of the heater can be kept from becoming too long.

In a case where the temperature fluctuation period of the last control cycle is shorter than the first threshold, the controller may set an amount of adjustment for the energization amount $E_{n+1}-E_n$ in such a manner that the shorter the temperature fluctuation period, the greater the amount of adjustment for the energization amount $E_{n+1}-E_n$.

According to this configuration, if the energization amount during the heating period of the last control cycle is inadequate, the energization amount can be quickly brought to an appropriate amount.

The fuser may comprise a heating member configured to be heated by the heater, and a pressure member configured to nip the sheet in combination with the heating member. The heating member may comprise a rotation member capable of rotating around the heater.

In this case, the controller can cause the rotation member to rotate in a case where the toner image is fixed onto the sheet by the fuser, and prohibit the rotation member from rotating during standby control.

The controller may be configured to exercise printing control under which energization to the heater is controlled to adjust the temperature of the fuser to a target fixing temperature in a case where the toner image is fixed onto the sheet by the fuser. The target standby temperature is below the target fixing temperature.

In yet another aspect, the controller may be configured to energize the heater with a third heating intensity during a temperature drop standby period in which the controller waits until the temperature of the fuser drops to the target standby temperature after the temperature of the fuser becomes equal to or above the target standby temperature subsequent to lapse of the heating period, in a case where the temperature of the fuser is above the target standby temperature upon lapse of a second predetermined time period from start of the heating period.

According to this configuration, since the temperature of the heater can be kept from dropping to an excessively low temperature, the inrush current flowing through the heater can be kept from becoming too large upon starting energization to the heater in the next control cycle.

The controller may configured to energize the heater with the third heating intensity by a wave number control scheme at a duty ratio of 33%.

The above and other aspects, their advantages and further features will become more apparent by describing in detail illustrative, non-limiting embodiments thereof with reference to the accompanying drawings briefly described below:

FIG. 9 is one example of a table used for setting a duty ratio according to a third example.

A detailed description will be given of a non-limiting embodiment with reference made to the drawings where appropriate.

Figure 1:
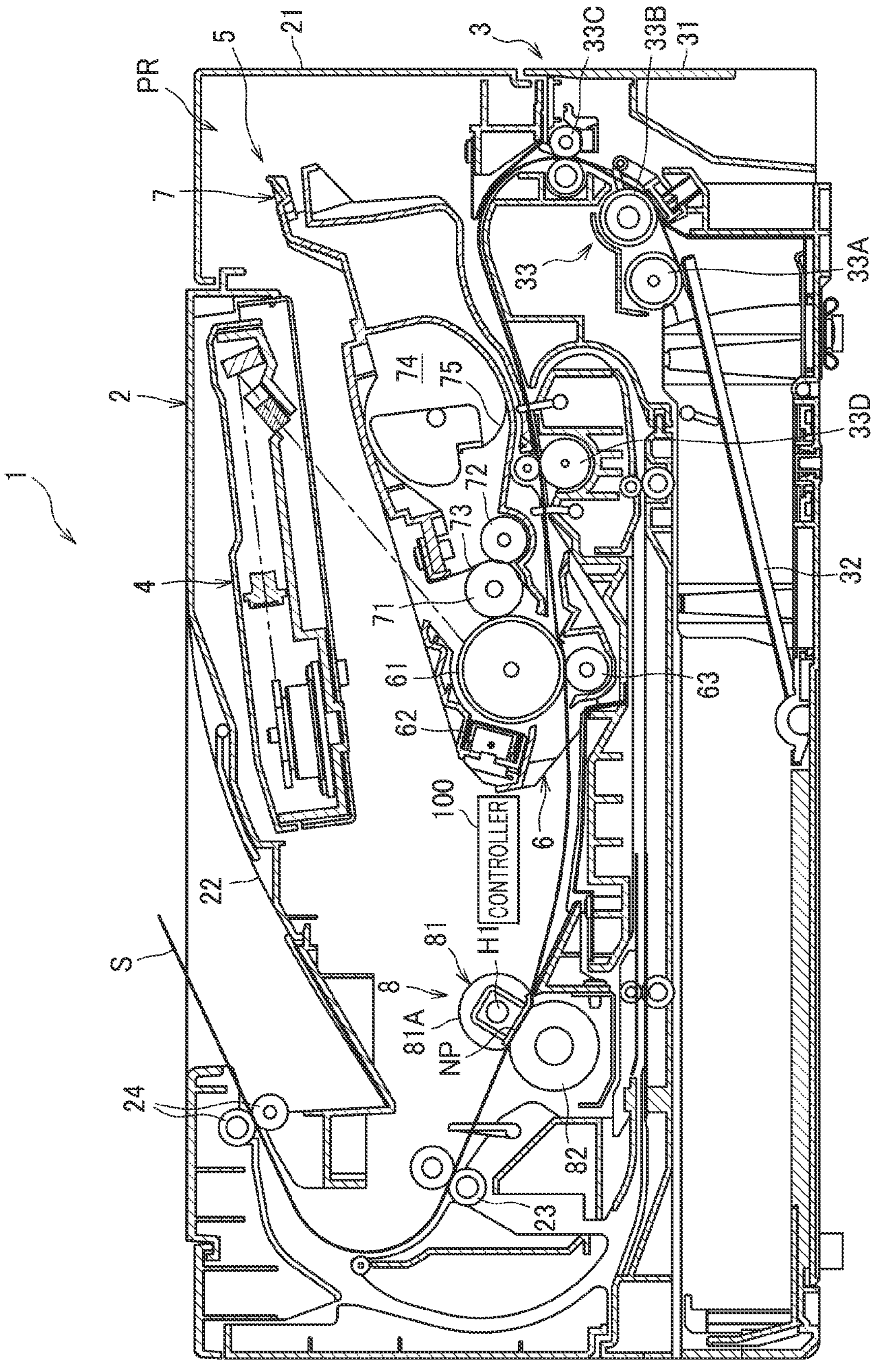
FIG. 1 is an illustration of a laser printer.

As shown in FIG. 1, an image forming apparatus 1 is a laser printer for forming an image on a sheet S. The image forming apparatus 1 comprises a housing 2, a feeder unit 3, a process unit PR, a fuser 8, and a controller 100.

The feeder unit 3 is a mechanism for feeding a sheet S to the process unit PR and is arranged in a lower space within the housing 2. The feeder unit 3 comprises a sheet tray 31 that holds sheets S, a sheet pressing plate 32, and a feeding mechanism 33. The feeding mechanism 33 includes a pick-up roller 33A, a separator roller 33B, a first conveyor roller 33C, and a register roller 33D. The sheets S in the sheet tray 31 are pressed against the pick-up roller 33A by the sheet pressing plate 32 and fed by the pick-up roller 33A to the separator roller 33B. The sheets S are separated one from others by the separator roller 33B and conveyed one by one by the first conveyor roller 33C. The register roller 33D aligns a leading edge of each sheet S, and then conveys the sheet S to the process unit PR. In this description, a direction of conveyance of a sheet S is referred to simply as "conveyance direction", and a direction perpendicular to the conveyance direction and parallel to the surfaces of the sheet S being conveyed is referred to simply as "width direction".

The process unit PR has a function of forming a toner image on a sheet S fed from the feeder unit 3. The process unit PR is a toner image forming unit. The process unit PR comprises an exposure device 4 and a process cartridge 5.

The exposure device 4 is disposed in an upper space within the housing 2, and comprises a laser light source (not shown), a polygon mirror, lenses, a reflector (shown with reference characters omitted), etc. The exposure device 4 is configured in such a manner that a laser light based on image data is emitted from the laser light source to scan a surface of a photosensitive drum 61 and thereby expose the surface of the photosensitive drum 61 to light.

The process cartridge 5 is disposed below the exposure device 4, and configured to be installable into and removable from the housing 2 through an opening formed when a front cover 21 of the housing 2 is opened. The process cartridge 5 comprises a drum unit 6 and a development unit 7.

The drum unit 6 includes the photosensitive drum 61, a charger 62, and a transfer roller 63. The development unit 7 is installable into and removable from the drum unit 6, and includes a development roller 71, a supply roller 72, a doctor blade 73, a toner container 74, and an agitator 75. The toner container 74 contains dry toner as an example of toner.

In the process cartridge 5, the surface of the photosensitive drum 61 is uniformly charged by the charger 62 and thereafter exposed to laser light emitted from the exposure device 4 to form an electrostatic latent image on the surface of the photosensitive drum 61 based on image data. Toner in the toner container 74, being agitated by the agitator 75, is supplied to the development roller 71 via the supply roller 72, enters the space between the development roller 71 and the doctor blade 73 as the development roller 71 rotates, and is carried on the development roller 71 as a thin layer with a uniform thickness.

The toner carried on the development roller 71 is supplied from the development roller 71 to the electrostatic latent image formed on the surface of the photosensitive drum 61. As a result, the electrostatic latent image is visualized and a toner image is formed on the photosensitive drum 61. Subsequently, when the sheet S fed from the feeder unit 3 is conveyed through between the photosensitive drum 61 and the transfer roller 63, the toner image formed on the surface of the photosensitive drum 61 is transferred onto the sheet S.

The fuser 8 fixes the toner image onto the sheet S. The fuser 8 comprises a heater H1, a heating member 81, and a pressure member 82. The heater H1 is an electric resistance heater. The heating member 81 is heated by the heater H1 and includes a rotation member 81A and a nip plate NP. The rotation member 81A is configured to rotate around the heater H. The heater H1 and the nip plate NP are both arranged inside the heating member 81. The pressure member 82 nips the sheet S in combination with the heating member 81.

The rotation member 81A is a rotatable endless belt. The rotation member 81A comprises a substrate made of metal, plastic or the like, and a release layer that covers an outer peripheral surface of the substrate.

The heater H1 is, as one example, a halogen heater (halogen lamp) which, when energized, generates light and heat, and heats the rotation member 81A by radiant heat. The heater H1 is arranged along the width direction and inside the rotation member 81A.

The pressure member 82 is a rotatable pressure roller and comprises an elastic layer made of elastically deformable rubber or the like provided on an outer peripheral surface thereof.

The nip plate NP is a plate-shaped member that receives radiant heat from the heater H1. The nip plate NP is arranged inside the heating member 81 in such a manner that an inner circumferential surface of the heating member 81 slidably contacts a lower surface of the nip plate NP. The nip plate NP nips the heating member 81 in combination with the pressure member 82. The fuser 8 thermally fixes a toner image on a sheet S as the sheet S with the toner image transferred thereon is conveyed through between the heating member 81 and the pressure member 82. The sheet S with the toner image thermally fixed thereon is ejected onto an output tray 22 by a second conveyor roller 23 and an ejection roller 24.

Figure 2:
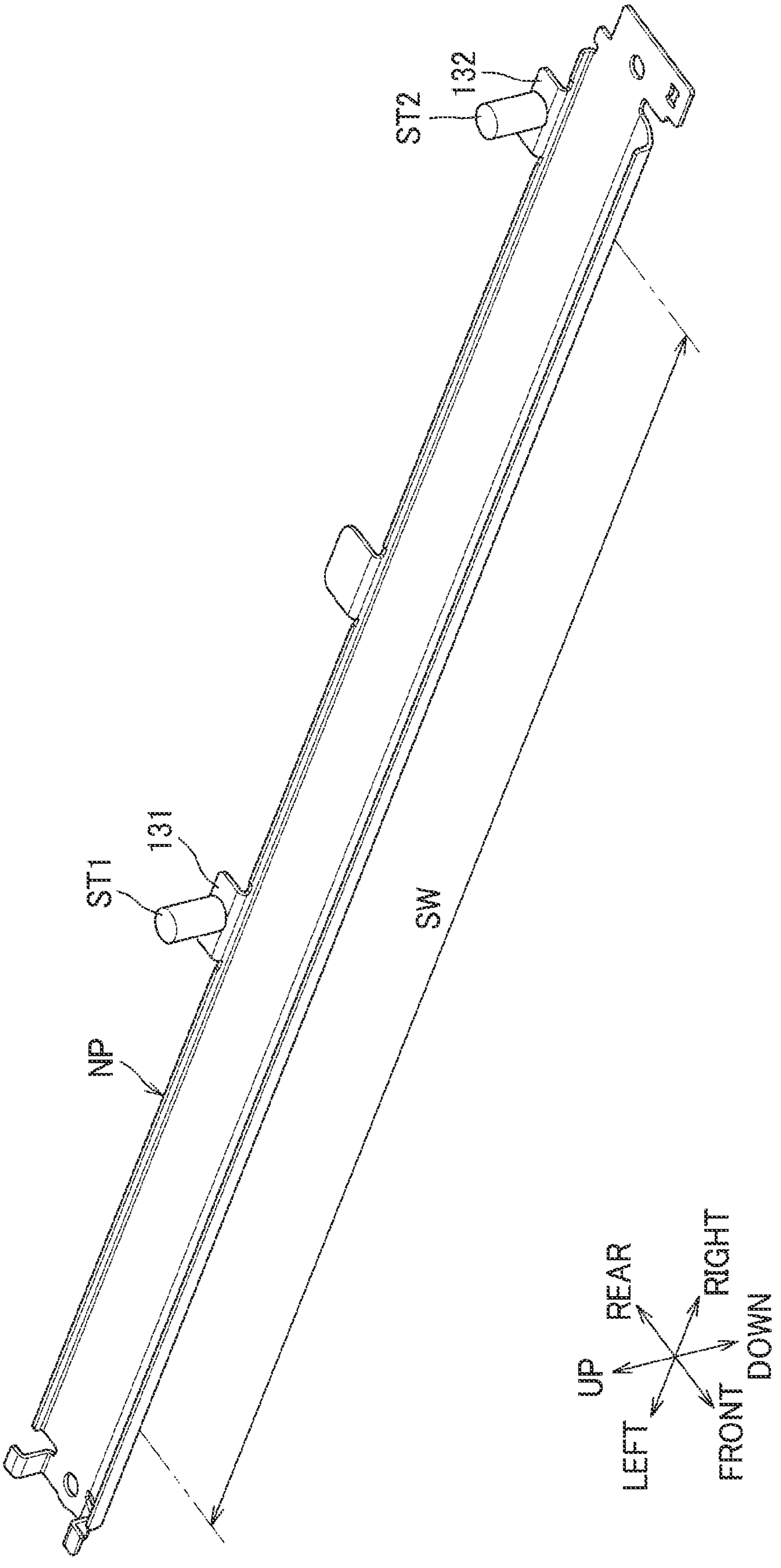
FIG. 2 is a perspective view showing an arrangement of sensors relative to a nip plate.

As shown in FIG. 2, the nip plate NP has two end portions positioned apart from each other in the width direction and a central portion positioned between the two end portions. The nip plate NP comprises a central detection portion 131 and an end detection portion 132 both protruding from an edge of the nip plate NP in the conveyance direction. The central detection portion 131 is located at the central portion. The end detection portion 132 is located at one end portion. A central temperature sensor ST1 is arranged to face the central detection portion 131. An end temperature sensor ST2 is arranged to face the end detection portion 132. The central temperature sensor ST1 is one example of a temperature sensor for detecting a temperature of the fuser 8.

The central temperature sensor ST1 detects a temperature of the central portion of the heating member 81. Specifically, the central temperature sensor ST1 detects the temperature of the central detection portion 131 of the nip plate NP in a contact or non-contact manner.

The end temperature sensor ST2 detects the temperature of one end portion of the heating member 81. Specifically, the end temperature sensor ST2 detects the temperature of the end detection portion 132 of the nip plate NP in a contact or non-contact manner. More specifically, the end temperature sensor ST2 is located outside the maximum area SW in which a sheet S can be subjected to a fixing process by the fuser 8 in the width direction. Alternatively, the end temperature sensor ST2 may be located inside the area SW in the width direction.

Thermistors may be used, for example, as the central temperature sensor ST1 and the end temperature sensor ST2.

Figure 3:
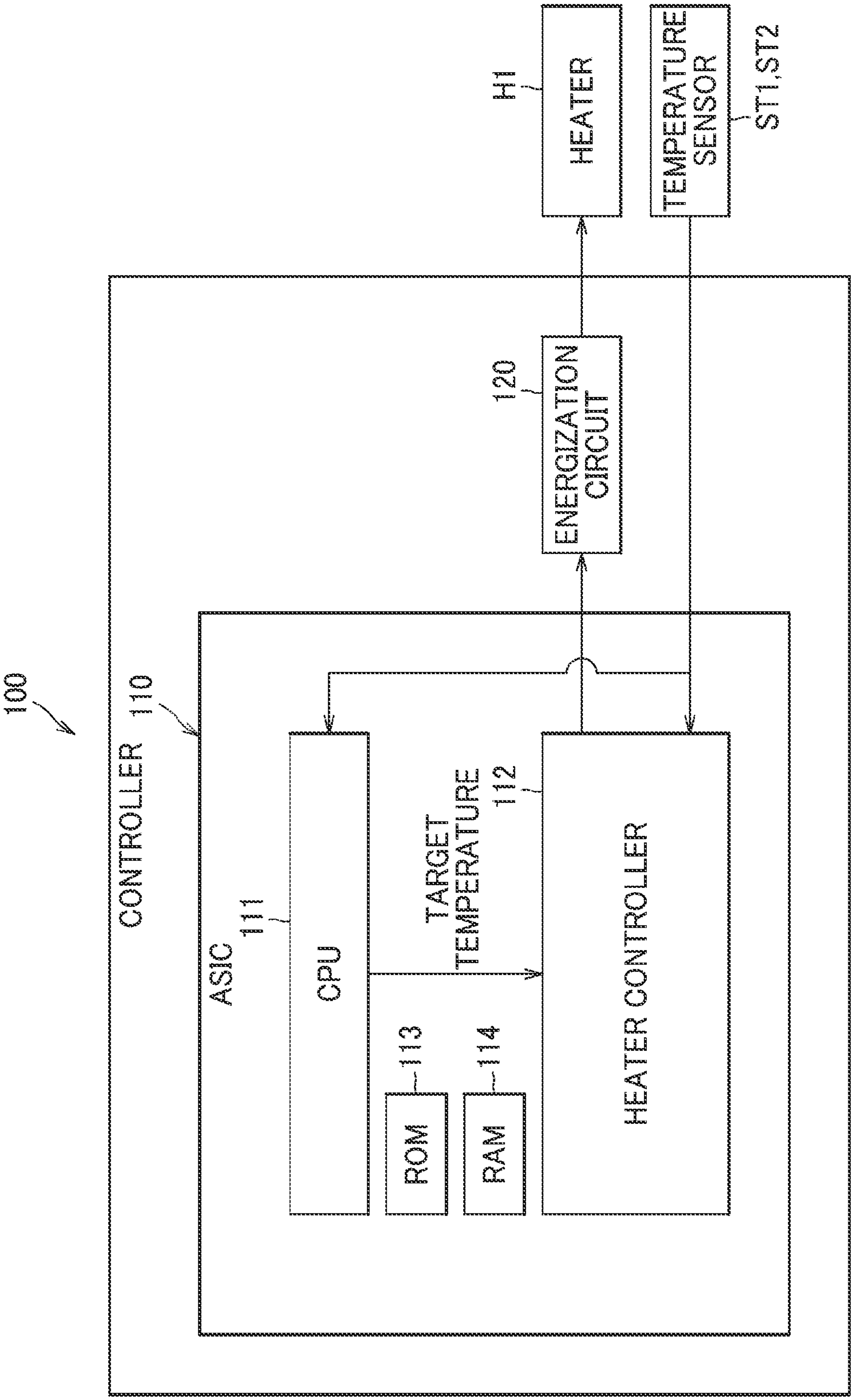
FIG. 3 is a block diagram showing a configuration of a controller.

As shown in FIG. 3, the controller 100 comprises an ASIC 110, and an energization circuit 120. The ASIC 110 includes a CPU 111, a heater controller 112, and memory units such as a ROM 113, a RAM 114, etc. The energization circuit 120 is connected to the heater H1 and the ASIC 110, and includes a switching circuit or the like, for switching the state of application of an input AC voltage (alternating voltage) to a state for energizing or to a state for de-energizing the heater H1.

The CPU 111 is implemented in the ASIC 110 as a function. The CPU 111 outputs target temperatures to the heater controller 112. The target temperatures are targets for detection temperatures T detected by the central temperature sensor ST1. The target temperatures are command values in a feedback process in which the heater controller 112 controls energization to the heater H1.

The heater controller 112 is a function or circuit implemented in the ASIC 110. When exercising printing control, the heater controller 112 controls the energization circuit 120 which energizes the heater H1 so that the detection temperature T detected by the central temperature sensor ST1 is adjusted to a target fixing temperature. More specifically, the heater controller 112 determines a duty ratio of the AC voltage for energizing the heater H1 based on the detection temperature T detected by the central temperature sensor ST1 and the target fixing temperature, and executes the feedback process in which the energization circuit 120 is controlled with the determined duty ratio. The feedback process executed by the heater controller 112 may be implemented on a chip outside the ASIC 110 or may be executed by the CPU.

During standby control under which the temperature of the fuser 8 is maintained within desired limits at temperatures around a target standby temperature TR, the heater controller 112 energizes the heater H1 with a duty ratio and a heating period output from the CPU.

The controller 100 exercises control by executing various arithmetic processing based on a printing job output from an external computer, temperatures detected by the central temperature sensor ST1 and the end temperature sensor ST2, and programs and/or data stored in the memory unit. In other words, the controller 100 operates according to programs and thus functions as a means for exercising various controls.

When a toner image is fixed onto a sheet S, the controller 100 controls the feeder unit 3, the process unit PR, and the fuser 8 to exercise printing control. During exercise of printing control, the controller 100 controls energization to the heater H1 to adjust the detection temperature T to the target fixing temperature. The controller 100 causes the rotation member 81A to rotate when fixing the toner image onto the sheet.

The controller 100 further exercises standby control under which the temperature of the fuser 8 is maintained within desired limits at temperatures around the target standby temperature TR, based on the detection temperature T detected by the central temperature sensor ST1. Standby control is a control under which the temperature of the fuser 8 is maintained within desired limits at temperatures around the predetermined target standby temperature TR so that printing can be promptly started. The predetermined target standby temperature TR is higher than room temperature and lower than the target fixing temperature. The controller 100 shifts to standby control, for example, when printing control ends, or when power to the image forming apparatus has been turned on but the controller 100 does not receive a printing job before lapse of a predetermined time period from a time at which the temperature of the fuser 8 is heated up to a fixing temperature. The controller 100 ends energization to the heater H1 of the fuser 8 and shifts to a sleep mode if a printing job is not input before lapse of a predetermined time period from start of standby control.

During standby control, the controller 100 repeats a control cycle that includes energizing the heater H1 with an amount of energization (energization amount) $E_n$ during a preset heating period in a case where the detection temperature T has dropped below the target standby temperature TR, and waiting until the detection temperature T drops to the target standby temperature TR in a case where the detection temperature has risen to a temperature equal to or above the target standby temperature TR after the heating period has elapsed. The time period of the control cycle, in this case, is from when the controller 100 starts energizing the heater H1 until when the detection temperature T drops to the target standby temperature TR. In this description, waiting until the detection temperature T drops to the target standby temperature TR in a case where the detection temperature T has risen to a temperature equal to or above the target standby temperature TR after lapse of the heating period is referred to as "temperature drop standby". In other words, temperature drop standby is a control, exercised during the control cycle, in which the controller 100 waits until the detection temperature T drops to the target standby temperature TR after the detection temperature T has risen above the target standby temperature TR.

The energization amount $E_n$ that is the amount of energization with which the heater H1 is energized during the heating period is an amount that causes the temperature of the fuser 8 to rise above the target standby temperature TR under normal circumstances. In exceptional cases where the image forming apparatus 1 is located in an extremely cold environment, the detection temperature T may not reach the target standby temperature TR when the heater H1 is energized with the energization amount $E_n$. To deal with such a situation, if the detection temperature T is below the target standby temperature TR upon lapse of a predetermined time period from start of the heating period, the controller 100 energizes the heater H1 and starts a next control cycle after lapse of the heating period. The controller 100 sets an energization amount $E_{n+1}$ for the next control cycle at an amount greater than the energization amount $E_n$ for the last control cycle. The time period of the control cycle, in this case, is a time period from when the controller 100 starts energizing the heater H1 until lapse of the predetermined time period. When the heater H1 is energized, energization and de-energization are alternately repeated at short intervals under duty control. However, short periods of de-energization under duty control are included in the heating period.

The above predetermined time period is a fixed period of time. The predetermined time period is, for example, around 0.5 to 5 seconds and is determined by operation tests or the like of the image forming apparatus 1. The length of time set as the heating period is shorter than the predetermined time period. The controller 100 energizes the heater H1 during the heating period within the predetermined time period.

It is to be understood that the controller 100 does not cause the rotation member 81A to rotate during standby control.

The controller 100 measures a temperature fluctuation period CT that is a time period from start of energizing the heater H1 to an end of one control cycle, and sets an energization amount $E_{n+1}$ for the next control cycle at an amount greater than an energization amount $E_n$ for the last control cycle if the temperature fluctuation period CT of the last control cycle is shorter than a first threshold CT1. On the other hand, the controller 100 sets the energization amount $E_{n+1}$ for the next control cycle at an amount smaller than the energization amount $E_n$ for the last control cycle if the temperature fluctuation period CT of the last control cycle is equal to or longer than a second threshold CT2 greater than the first threshold CT1. Further, the controller 100 sets the energization amount $E_{n+1}$ for the next control cycle at the same amount as the energization amount $E_n$ for the last control cycle if the temperature fluctuation period CT of the last control cycle is equal to or longer than the first threshold CT1 and shorter than the second threshold CT2.

The amount of heat, i.e., amount of energization (energization amount) to the heater H1 necessary to maintain the fuser 8 within desired limits at temperatures around the target standby temperature TR, varies depending on ambient temperature, temperature of the fuser 8, voltage of a power supply, variations in heating ability of the heater H1, etc. Therefore, the controller 100 appropriately adjusts the energization amount to the heater H1 applied during the heating period of the control cycle. It is possible to adjust the energization amount by adjusting an output of (energization amount per unit time to) the heater H1 without changing a length of the heating period, or by adjusting the length of the heating period without changing the output of the heater H1. In this example, the case will be described in which the length of the heating period is changed to adjust the energization amount to the heater H1. The controller 100 changes the heating period to a time period longer than a heating period of the last control cycle to adjust the energization amount to a greater amount, and changes the heating period to a time period shorter than the heating period of the last control cycle to adjust the energization amount to a smaller amount.

Figure 4A:
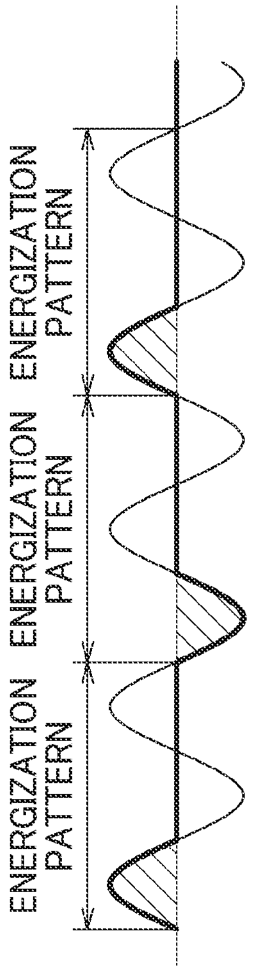
FIG. 4A is an illustration showing an energization pattern under wave number control.

The controller 100 controls energization to the heater H1 during the heating period by a wave number control scheme with a preset duty ratio. In this example, the duty ratio is fixed since the output of the heater H1 is not changed. The controller 100 adjusts the energization amount by changing the number of times of repeating a predetermined energization pattern of the wave number control scheme. One predetermined energization pattern of wave number control is defined as one time of energization. In other words, the controller 100 changes the number of times of energization to change the heating period. For example, as shown in FIG. 4A, the controller 100 energizes the heater H1 at a duty ratio of 33% by providing energization for a time period corresponding to a first one of three consecutive half waves of an AC voltage. The heating period is changed by changing the number of times this energization pattern is repeated. The hatched area in FIG. 4 indicates energization to the heater H1. The minimum number of repetitions is 2 in this example (this number of repetitions is referred to as "heating count"). When standby control is started for the first time after power to the image forming apparatus 1 is turned on, the controller 100 sets an energization amount of the first heating period at a minimum permissible amount. The heating count i is set, for example, at 2. When standby control is started other than after power to the image forming apparatus 1 is turned on, the heating count i is also set at the minimum value of 2.

When the temperature fluctuation period CT becomes longer, the temperature of the heater H1 may drop and cause a decrease in electrical resistance. If the heater H1 is energized in this situation, a large inrush current may flow through the heater H1. Therefore, when the temperature fluctuation period CT becomes longer, the controller 100 energizes the heater H1 with a relatively small amount of energization, and executes the normal heating process after the temperature of heater H1 rises sufficiently.

More specifically, the temperature of heater H1 drops after the heating period ends, as time elapses without the heater H1 being energized. The detection temperature T also drops after the heating period ends, as time elapses without the heater H1 being energized, but a drop rate of the detection temperature T is susceptible to influences from the environment in which the image forming apparatus 1 is located. For example, if the temperature of the environment in which the image forming apparatus 1 is located is high, the detection temperature T is less likely to drop which causes the temperature fluctuation period CT to become longer.

The resistance value of the heater H1 decreases as the temperature of the heater H1 drops. Therefore, if the temperature fluctuation period CT becomes longer, there is a possibility that a large inrush current will flow through the heater H1 upon energizing the heater H1 in the next heating period.

In order to avoid such a large inrush current flowing through the heater H1, the controller 100 energizes the heater H1 during a time period different from the heating period when the temperature fluctuation period CT becomes longer. This raises the temperature of the heater H1 and keeps electrical resistance of the heater H1 from becoming too small.

In the following description, "energizing the heater H1 during a time period different from the heating period to raise the temperature of the heater H1" is referred to as "preheating," and the "time period for executing preheating" is referred to as "preheating period".

In more detail, if the temperature fluctuation period CT of the last control cycle is equal to or longer than a third threshold CT3 greater than the second threshold CT2, the preheating period is provided before the heating period of the next control cycle. The heater H1 is energized during the preheating period, with a first heating intensity smaller than a heating intensity with which the heater H1 is energized during the heating period of the last control cycle, and then the heater H1 is energized during the heating period with a second heating intensity greater than the first heating intensity. In this example, if the preheating period is provided, the total energization amount that is the total amount of energization effected during the preheating period and the heating period is kept from becoming too large by decreasing the heating count i. More specifically, if the heating count i is greater than the initial value of 2, the heating count i by which the heater H1 is actually energized is changed to a smaller number (number of times). Further, in this example, if the preheating period is provided, the preheating period is included in the temperature fluctuation period CT.

Figure 4B:
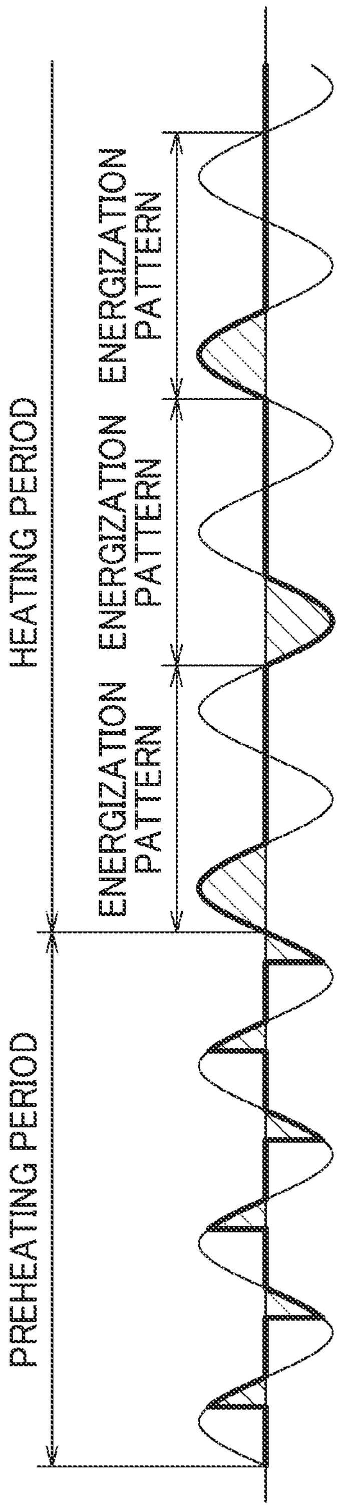
FIG. 4B is an illustration showing one example of a voltage waveform when a preheating period under phase control is provided.

The heating intensity in this description is electric power per unit time. In the case an AC voltage is applied to the heater H1, the heating intensity refers to a duty ratio of the AC voltage. In this example, if the temperature fluctuation period CT is equal to or longer than the third threshold CT3, the controller 100, as shown in FIG. 4B, controls energization to the heater H1 during the heating period by a wave number control scheme, and controls energization to the heater H1 during the preheating period by a phase control scheme.

Phase control is a method of controlling a duty ratio of a voltage for energizing a load (the heater H1 in this example) by controlling an ignition phase of an AC voltage every half cycle.

Wave number control is a method of controlling a duty ratio of an AC voltage for energizing a load (the heater H1 in this example) by controlling within a predetermined cycle of the AC voltage, the ratio of the number of half waves of the voltage for energizing the load to the number of half waves of the voltage for not energizing the load.

As an example, during the preheating period, a phase angle of phase control is regulated to be greater than half (90°) of each half wave of the AC voltage so that the duty ratio is smaller than that in the heating period. In the example shown in FIG. 4B, phase control of half waves is repeated six times during the preheating period. In FIG. 4B, change in voltage is shown as an example. Change in current is such that in a first half wave of the preheating period, a greater current flows through the heater H1 due to the heater H1 cooling down and causing electrical resistance of the heater H1 to decrease. In subsequent half waves, the later the half wave, the smaller the current flowing through the heater H1.

Figure 5:
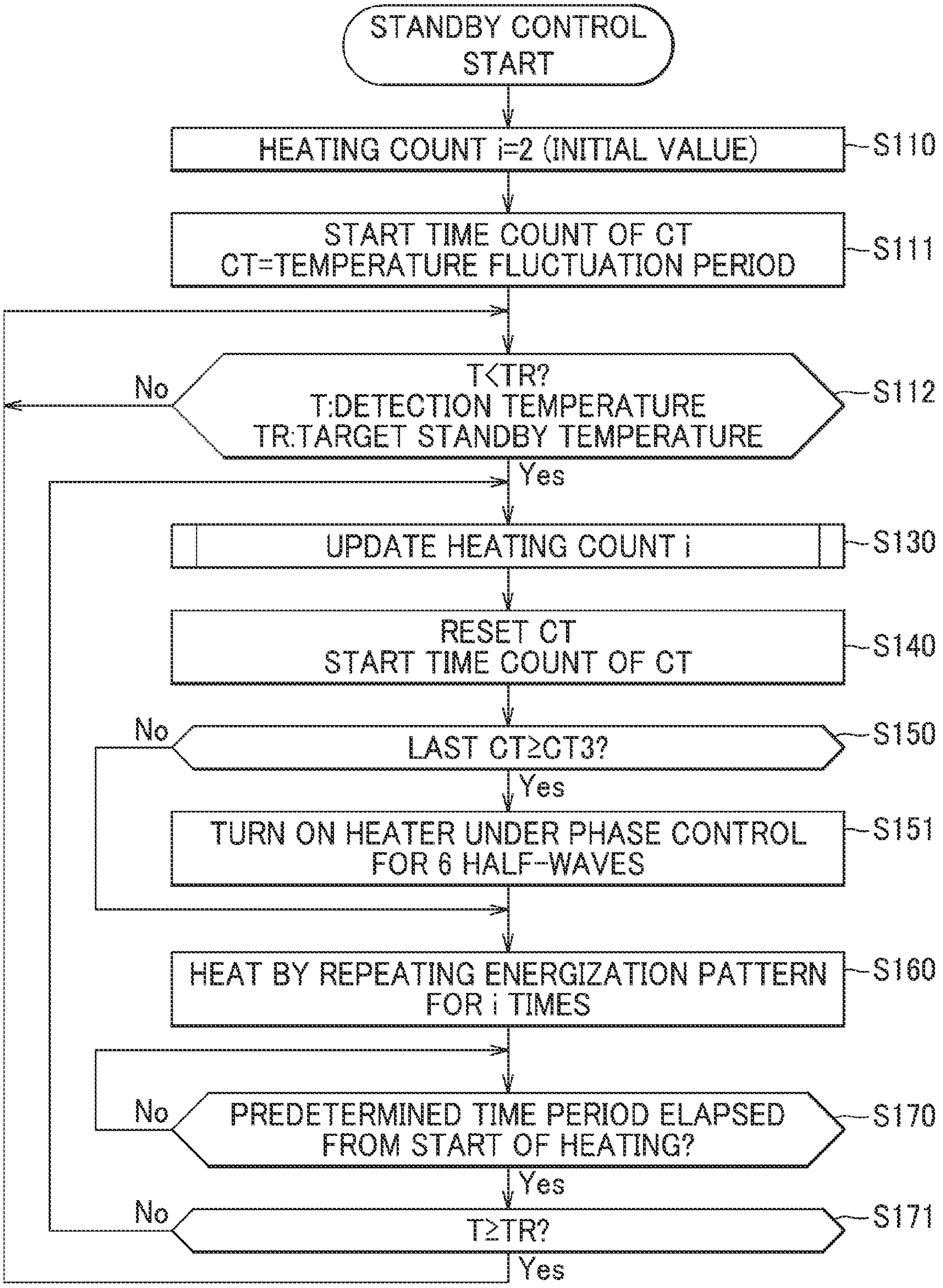
FIG. 5 is a flowchart of a standby control process according to a first example.

An example process of standby control for realizing the above-described controller 100 will be described with reference to FIG. 5. As shown in FIG. 5, when standby control is started, the controller 100 first sets the heating count i at 2 which is the minimum and initial value (S110). Subsequently, the controller 100 starts a time count of the temperature fluctuation period CT (S111) and waits until the detection temperature T drops below the target standby temperature TR (S112, No). If it is determined that the detection temperature T has dropped below the target standby temperature TR (S112, Yes), the controller 100 updates the heating count i (S130).

Figure 6:
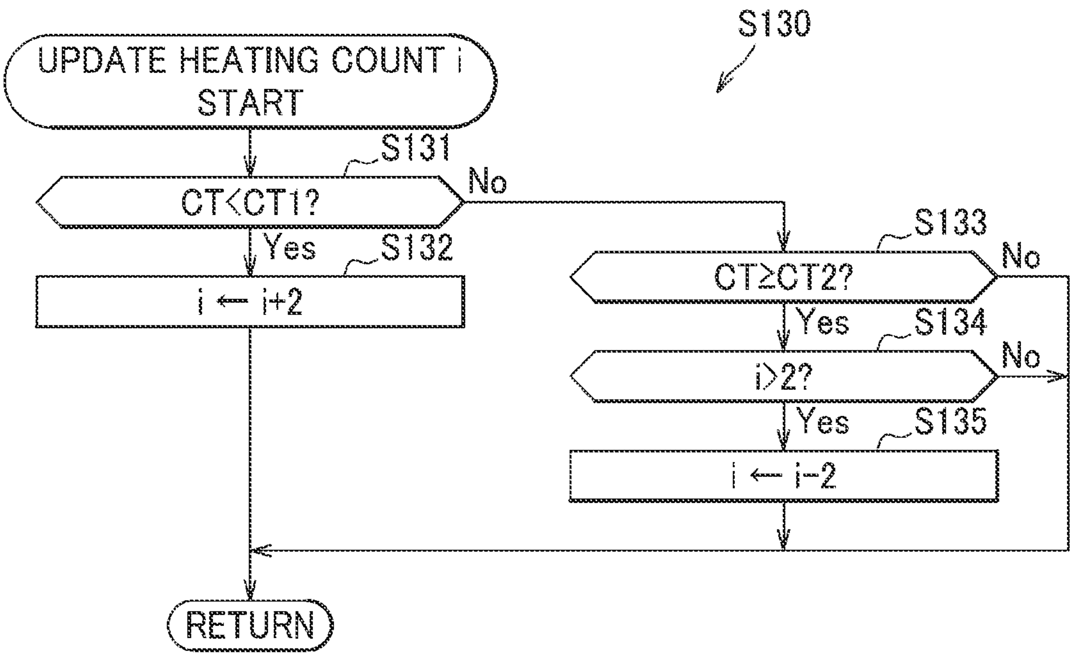
FIG. 6 is a flowchart of a subroutine for updating a heating count.

The update of the heating count i is performed based on the temperature fluctuation period CT counted from when heating is started in the control cycle. Specifically, as shown in FIG. 6, the controller 100 determines whether the temperature fluctuation period CT is shorter than the first threshold (S131), and if so (Yes), increases the heating count i by 2 (S132) and ends the subroutine for updating the heating count i. On the other hand, if it is determined in step S131 that the temperature fluctuation period CT is not shorter than the first threshold CT1, i.e., the temperature fluctuation period CT is equal to or longer than the first threshold CT1 (No), the controller 100 further determines whether the temperature fluctuation period CT is equal to or longer than the second threshold CT2 (S133). If it is determined in step 133 that the temperature fluctuation period CT is not equal to or longer than the second threshold CT2 (No), i.e., the temperature fluctuation period CT is equal to or longer than the first threshold CT1 and shorter than the second threshold CT2, it is considered that the last energization amount $E_n$ is comparatively appropriate. Thus, the controller 100 ends the subroutine for updating the heating count i without changing the heating count i. If it is determined in step S133 that the temperature fluctuation period CT is equal to or longer than the second threshold CT2 (Yes), the controller 100 determines whether the heating count i is greater than the lower limit of 2 (S134), and if so (Yes), reduces the heating count by 2 (S135) and ends the subroutine for updating the heating count i. On the other hand, if the heating count i not greater than the lower limit of 2 (S134, No), the controller 100 ends the subroutine for updating the heating count i without changing the heating count i.

Referring back to FIG. 5, after updating the heating count i (S130), the controller 100 resets and starts the time count of the temperature fluctuation period CT (S140). At this time, the temperature fluctuation period CT before reset is stored as the last temperature fluctuation period CT. Next, the controller 100 determines whether the last temperature fluctuation period CT is equal to or longer than the third threshold CT3 (S150), and if so (Yes), provides the preheating period before the heating period. In other words, the controller 100 energizes the heater H1 under phase control for a period of six half-waves (S151). The controller 100 then proceeds to step S160. If it is determined in step S150 that the last temperature fluctuation period CT is not equal to or longer than the third threshold CT3 (No), the controller 100 proceeds to step S160 without providing the preheating period.

Subsequently, the controller 100 repeats the energization pattern for i times to energize and heat the heater H1 (S160). Then, the controller 100 determines whether a predetermined time period has elapsed from start of heating, i.e., from start of energizing the heater H1 (S170). If it is determined in step S170 that the predetermined time period has not elapsed (No), the controller 100 waits until lapse of the predetermined time period.

If it is determined in step S170 that the predetermined time period has elapsed (Yes), the controller 100 determines whether the detection temperature T is equal to or above the target standby temperature TR (S171). If it is determined in step S171 that the detection temperature T is not equal to or above the target standby temperature TR, i.e., the detection temperature T is below the target standby temperature TR (No), the controller 100 ends the control cycle and proceeds to update the heating count i in step S130 to start the next heating process. On the other hand, if it is determined in step S171 that the detection temperature T is equal to or above the target standby temperature TR (Yes), the controller 100 returns to step S112 and waits until the detection temperature T drops to the target standby temperature TR (S112, No), and if it does (S112, Yes), then proceeds to update the heating count i in step S130 to start the next heating process.

The controller 100 repeats the process of steps S112 to S171 until a condition for ending standby control is satisfied, such as until a new printing job is received.

Figure 7:
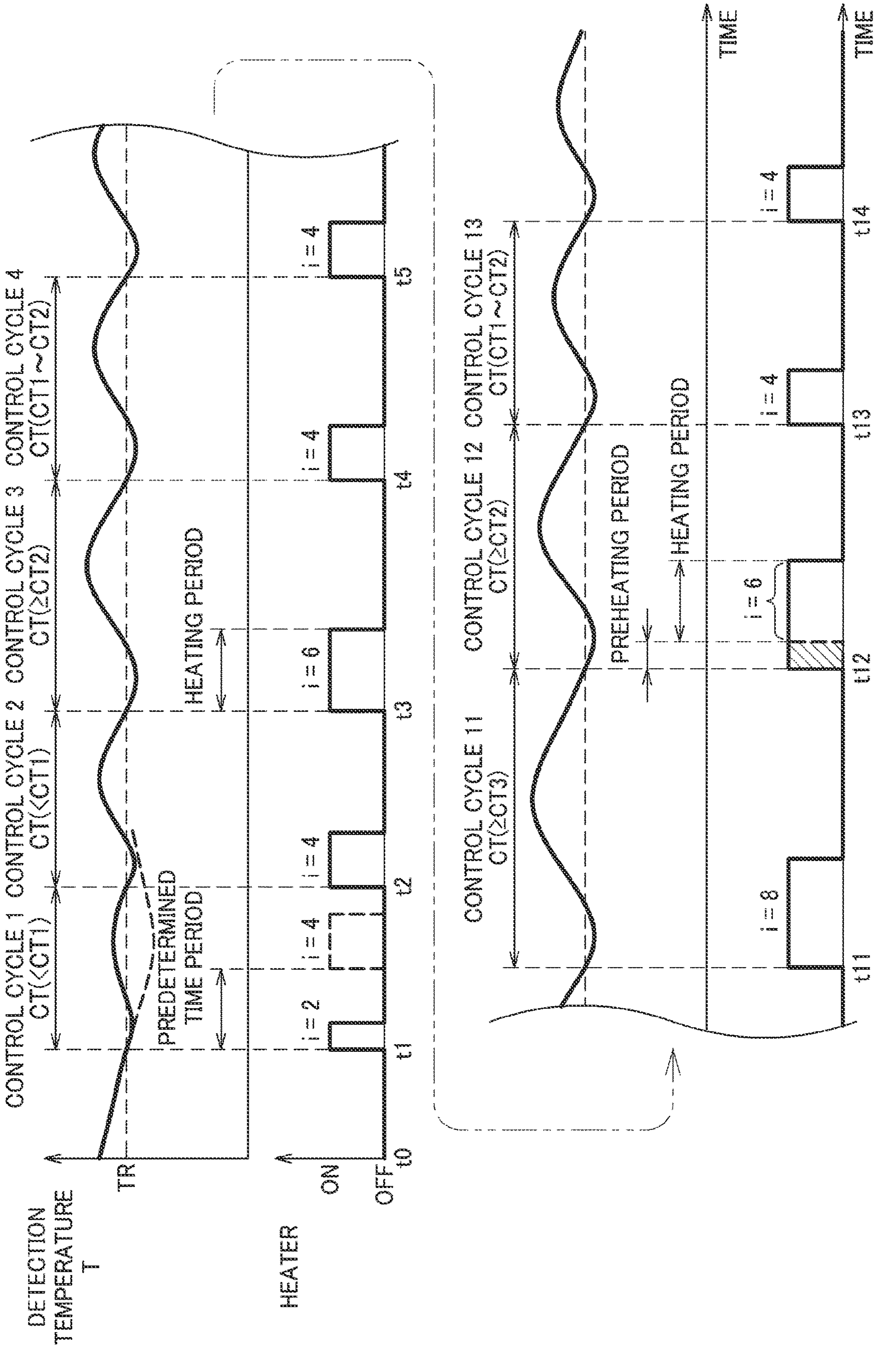
FIG. 7 is a time chart showing one example of heater operation and temperature fluctuation under standby control according to the first example.

One example of operation of the heater H1 and fluctuation of the detection temperature T during execution of standby control according to the above-described process will be described. As shown by a solid line in FIG. 7, when standby control is started at time to, due to, for example, a printing process ending, the controller 100 waits until the detection temperature T drops to the target standby temperature TR. When the detection temperature T drops to the target standby temperature TR (t1), the controller 100 starts the control cycle. The controller 100 energizes the heater H1 under duty control by repeating the energization pattern for the minimum heating count i (=2). Although the period of time during which the heater H1 is on (heating period) is shown as a continuous period in FIG. 7, the heater H1 is actually turned on and off repeatedly for short periods of time in order to repeat the energization pattern at a duty ratio of 33% as shown in FIG. 4 for the heating count i. In the first control cycle 1, for example, the energization amount is not sufficient with respect to the ambient temperature. Thus, the temperature fluctuation period CT from when the detection temperature T has risen above the target standby temperature TR until the detection temperature T drops to the target standby temperature TR is shorter than the first threshold CT1. In this case, the controller 100 increases the heating count i by 2 and energizes the heater H1 in the control cycle 2 by repeating the energization pattern four times (t2). When the control cycle 2 ends (t3), the temperature fluctuation period CT is, for example, still shorter than the first threshold CT1. Therefore, the controller 100 increases the heating count i by 2, similar to the control cycle 1. In the control cycle 3, the heater H1 is energized by repeating the energization pattern six times (t3). As a result, the energization amount reaches a sufficient amount and the temperature fluctuation period CT becomes longer, for example, equal to or longer than the second threshold CT2. In this case, the controller 100 reduces the heating count i by 2. Thus, in the next control cycle 4, the heater H1 is energized by repeating the energization pattern four times (t4). As a result, the temperature fluctuation period CT of the control cycle 4 becomes equal to or longer than the first threshold CT1 and shorter than the second threshold ST2. Thus, the controller 100 starts the heating process of the next control cycle without changing the heating count i (t5).

When standby control continues for a while and the ambient temperature changes, the heating count i may become 8 for example, as in the control cycle 11 (t11). Then, the temperature fluctuation period CT may become equal to or longer than the third threshold CT3. In such a case, the controller 100 reduces the heating count i by 2 to a heating count i of 6, and provides the preheating period before the heating period in the next control cycle 12. During the preheating period, the controller 100 energizes the heater H1 under phase control for a period of six half-waves (t12). Immediately after the preheating period, the controller 100 energizes the heater H1 under wave number control by repeating the energization pattern six times. As a result, a relatively small amount of current is applied to the heater H1 and inrush current can thereby be kept from becoming too large. When the temperature fluctuation period CT becomes equal to or longer than the second threshold CT2 in the control cycle 12, the controller 100 reduces the heating count i by 2 and energizes the heater H1 under wave number control by repeating the energization pattern four times (t13). When the temperature fluctuation period CT becomes equal to or longer than the first threshold CT1 and shorter than the second threshold CT2 in the control cycle 13, the controller 100 starts the heating process of the next control cycle (t14) without changing the heating count i.

In another example operation such as when the ambient temperature is extremely low, the detection temperature T may not become equal to or above a target standby temperature TR within the predetermined time period even if the heater H1 is energized by repeating the energization pattern two times from time t1. In this case, the controller 100 starts the next control cycle upon lapse of the predetermined time period as indicated by broken lines in FIG. 7, increases the heating count i by 2, and energizes the heater H1 by repeating the energization pattern four times.

Further, although not shown in the drawings, in still another example operation, if it takes time from time t0 for the detection temperature T to drop to the target standby temperature TR and the time count of the temperature fluctuation period CT becomes equal to or greater than the third threshold CT3, the preheating period is provided before the first heating period. In this case, since the heating count i is 2, the heater H1 is energized by repeating the energization pattern two times during the preheating period.

In this way, after starting standby control, if the length of the temperature fluctuation period CT is shorter than the first threshold CT1, the energization amount of the next control cycle is increased; if the temperature fluctuation period CT is equal to or longer than the second threshold CT2, the energization amount of the next control cycle is reduced; and if the temperature fluctuation period CT is equal to or longer than the first threshold CT1 and shorter than the second threshold CT2, the energization amount of the next control cycle is set at the same energization amount as that of the last control cycle. As a result, as the control cycle is repeated, the energization amount will be adjusted to an appropriate amount so that the temperature fluctuation period CT of one control cycle comes closer to a time period equal to or longer than the first threshold CT11 and shorter than the second threshold CT2.

Therefore, according to the present example, the de-energization time period of the heater H1 can be kept from becoming too long, and thus inrush current flowing through the heater H1 upon energizing the heater H1 can be kept from becoming too large. Further, when the control cycle becomes excessively short, a long term flicker perceptibility (Plt) may get worse. In the present example, since the temperature fluctuation period CT of one control cycle comes closer to a time period equal to or longer than the first threshold CT1 and shorter than the second threshold CT2, the long term flicker perceptibility can be kept from becoming worse.

After lapse of the heating period, if the temperature of the fuser 8 does not rise to a temperature equal to or above the target standby temperature TR upon lapse of a predetermined time period from start of the heating period, the controller 100 energizes the heater H1 and starts the next control cycle. Thus, after lapse of the heating period, even when the temperature of the fuser 8 does not rise to a temperature equal to or above a target standby temperature TR upon lapse of a predetermined time period from start of the heating period due to the ambient temperature being extremely low, the temperature of the fuser 8 can be adjusted to a temperature closer to the target standby temperature TR.

If the temperature fluctuation period CT is equal to or longer than the third threshold CT3, in the next control cycle, the controller 100 energizes the heater H1 with a first heating intensity smaller than a heating intensity with which the heater H1 is energized during the heating period of the last control cycle, and then energizes the heater H1 during the heating period with a second heating intensity greater than the first heating intensity. Thus, a relatively small amount of energization is applied to the heater H1 having a decreased electrical resistance due to a decrease in temperature. In this way, the temperature of the heater H1 gradually increases, and thus inrush current flowing through the heater H1 can be kept from becoming too large.

When standby control is started for the first time after power to the image forming apparatus is turned on, the controller 100 sets the energization amount (initial energization amount) of the heating period of the first control cycle at a minimum permissible amount. Thus, since an excessive amount of heat is not supplied to the heater H1, the de-energization time period of the heater H1 can be kept from becoming too long.

Next, a second example will be described. In this example, the same portions as those of the first example are identified by the same reference characters and explanation thereof is omitted. Only points different from those of the first example will be described in detail. The controller 100 of the image forming apparatus 1 of the second example is different from the first example in that during standby control, if the temperature fluctuation period CT of the last control cycle is shorter than the first threshold CT1, the controller 100 sets an amount of adjustment for the energization amount $E_{n+1}-E_n$ in such a manner that the shorter the temperature fluctuation period CT, the greater the amount of adjustment for the energization amount $E_{n+1}-E_n$.

Figure 8:
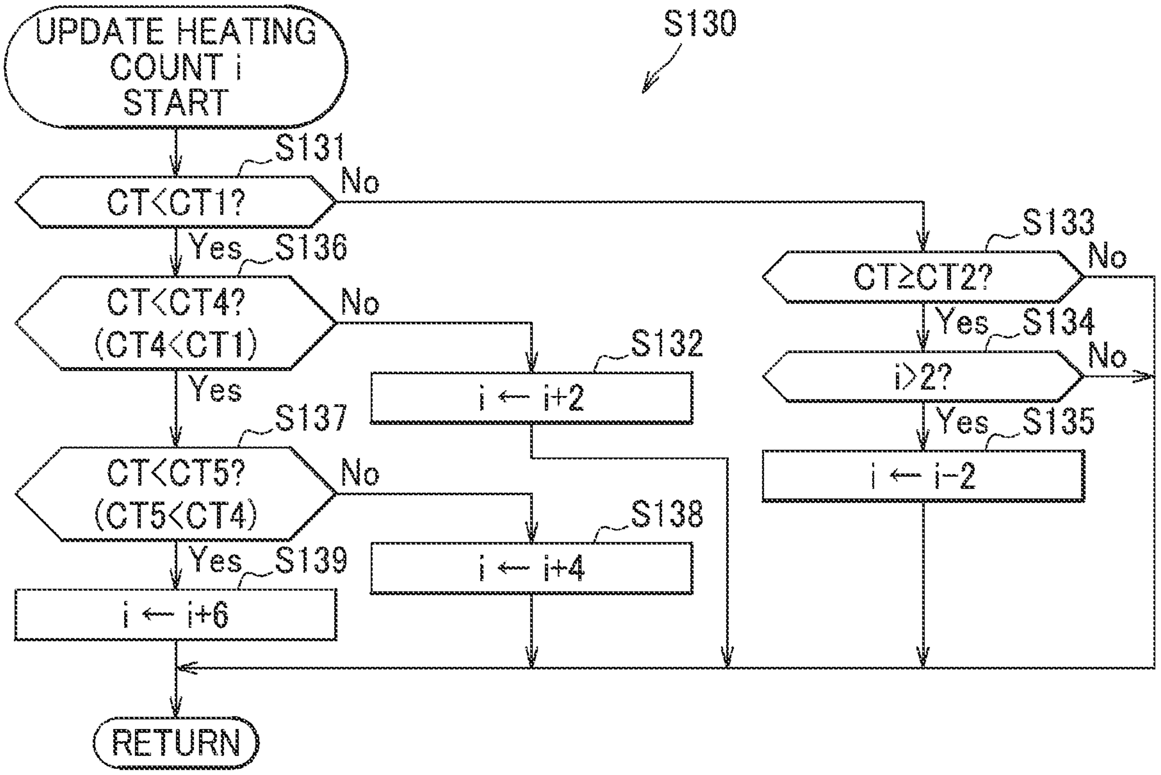
FIG. 8 is a flowchart of a subroutine for updating the heating count according to a second example.

For example, the controller 100 updates the heating count i as shown in the subroutine of FIG. 8. The controller 100 determines whether the temperature fluctuation period CT is shorter than the first threshold CT1 (S131), and if not (No), executes a process similar to the first example (S133 to S135).

If it is determined that the temperature fluctuation period CT is shorter than the first threshold CT 1 (S131, Yes), the controller 100 determines whether the temperature fluctuation period CT is shorter than a fourth threshold CT4 (S136). The fourth threshold CT4 is a value smaller than the first threshold CT1. If the temperature fluctuation period CT is not shorter than the fourth threshold CT4, i.e., if the temperature fluctuation period CT is equal to or longer than the fourth threshold CT4 and shorter than the first threshold (No), the heating count i is increased by 2 (S132), and the subroutine for updating the heating count i is ended.

On the other hand, if it is determined in step S136 that the temperature fluctuation period CT is shorter than the fourth threshold value CT4 (Yes), the controller 100 further determines whether the temperature fluctuation period CT is shorter than a fifth threshold CT5 (S137). The fifth threshold CT5 is a value smaller than the fourth threshold CT4. If it is determined in step S137 that the temperature fluctuation period CT is not shorter than the fifth threshold CT 5, i.e., the temperature fluctuation period CT is equal to or longer than the fifth threshold CT5 and shorter than the fourth threshold CT4 (No), the controller 100 increases the heating count i by 4 (S138) and ends the subroutine for updating the heating count i. If it is determined in step S137 that the temperature fluctuation period CT is shorter than the fifth threshold CT 5 (Yes), the controller 100 increases the heating count i by 6 (S 139) and ends the subroutine for updating the heating count i.

According to this process, when the temperature fluctuation period CT is shorter than the first threshold CT1, the heating count i is increased by 2 if the temperature fluctuation period CT is between the fourth threshold CT4 and the first threshold CT 1, the heating count i is increased by 4 if the temperature fluctuation period CT is between the fifth threshold CT5 and the fourth threshold CT4, and the heating count i is increased by 6 if the temperature fluctuation period CT is shorter than the fifth threshold CT5. Thus, if the energization amount during the heating period of the last control cycle is inadequate, the heating count i is increased according to a degree of inadequateness of the energization amount, so that the energization amount can be quickly brought to an appropriate amount.

Next, a third example will be described. In this example, the same portions as those of the first example are identified by the same reference characters and explanation thereof is omitted. Only points different from those of the first example will be described in detail. The image forming apparatus 1 of the third example is different from the first example in that when adjusting an energization amount of the heating period, an output of the heater H1 is changed without changing the length of the heating period. Specifically, the controller 100 is configured to energize the heater H1 during the heating period at a preset duty ratio, adjust the duty ratio to a duty ratio higher than a duty ratio of a last heating period to adjust the energization amount to a greater amount, and adjust the duty ratio to a duty ratio smaller than the duty ratio of the last heating period to adjust the energization amount to a smaller amount.

For example, the controller 100 stores a table shown in FIG. 9. The table of FIG. 9 shows the relationship between a heating intensity variable j and the duty ratio, where the duty ratio increases as the heating intensity variable j increases. For example, the duty ratio is 33% when the heating intensity variable j is 1, 40% when the heating intensity variable j is 2, . . . and 100% when the heating intensity variable j is 8.

Figure 10:
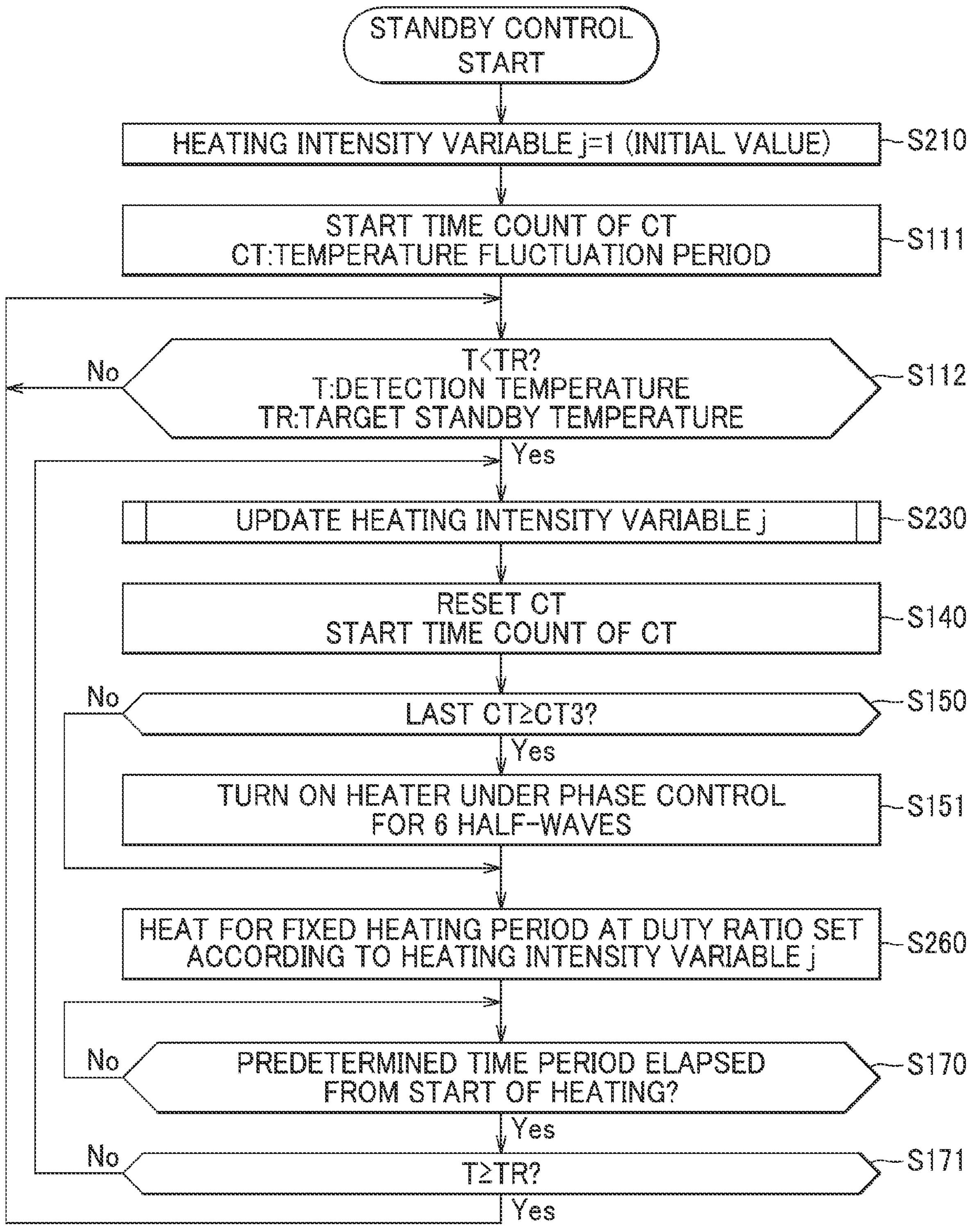
FIG. 10 is a flowchart of a standby control process according to the third example.

As shown in FIG. 10, during standby control, the controller 100 sets the heating intensity variable j at an initial value of 1 (S210). Then, after the process of steps S111 and S112, the controller 100 updates the heating intensity variable j (S230).

Figure 11:
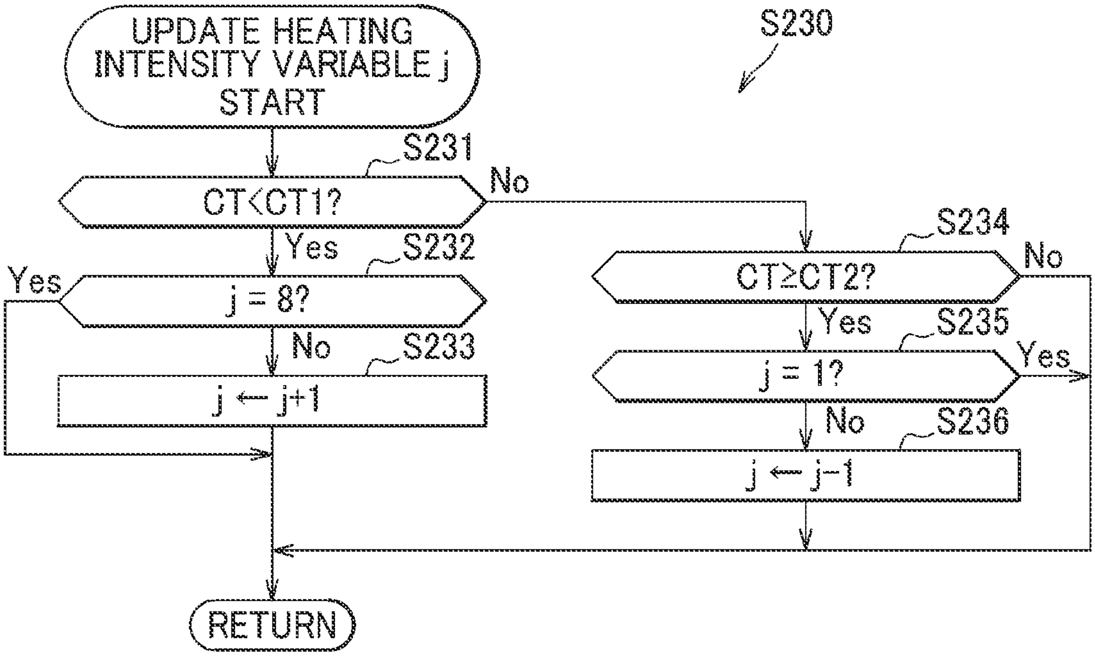
FIG. 11 is a flowchart of one example of a subroutine for updating the heating count according to the third example.

As shown in FIG. 11, when updating the heating intensity variable j, the controller 100 determines whether the temperature fluctuation period CT is shorter than the first threshold CT1 (S231), and if so (Yes), determines whether the heating intensity variable j is the maximum value of 8 (S232). If the heating intensity variable j is the maximum value of 8 (Yes, S232), the controller 100 ends the subroutine for updating the heating intensity variable j without increasing the heating intensity variable j. On the other hand, if the heating intensity variable j is not 8 (No, S232), the controller 100 increases the heating intensity variable j by 1 (S233) and ends the subroutine for updating the heating intensity variable j.

If the temperature fluctuation period CT is not shorter than the first threshold CT1, i.e., if the temperature fluctuation period CT is equal to or longer than the first threshold CT1 (No, S231), the controller 100 further determines whether the temperature fluctuation period CT is equal to or longer than the second threshold (S234). If it is determined in step S234 that the temperature fluctuation period CT is not equal to or longer than the second threshold (No), i.e., if the temperature fluctuation period CT is equal to or longer than the first threshold CT1 and shorter than the second threshold CT2, it is considered that the last energization amount $E_n$ is comparatively appropriate. Thus, the subroutine for updating the heating intensity variable j is ended without changing the heating intensity variable j. If it is determined in step S234 that the temperature fluctuation period CT is equal to or longer than the second threshold CT2 (Yes), the controller 100 determines whether the heating intensity variable j is equal to the lower limit of 1 (S235), and if so (Yes), ends the subroutine for updating the heating intensity variable j without reducing the heating intensity variable j. On the other hand, if the heating intensity variable j is not equal to 1 (No, S235), the controller 100 reduces the heating intensity variable j by 1 (S236), and ends the subroutine for updating the heating intensity variable j.

Referring back to FIG. 10, after updating the heating intensity variable j (S230), the controller 100 executes the process of steps S140 to S151 similar to those of the first example, and then heats the heater H1 for a fixed heating period at the duty ratio set according to the heating intensity variable j (S260). After steps S170 and S171, the controller 100 returns to step S112 or step S230 and repeats the process.

Figure 12:
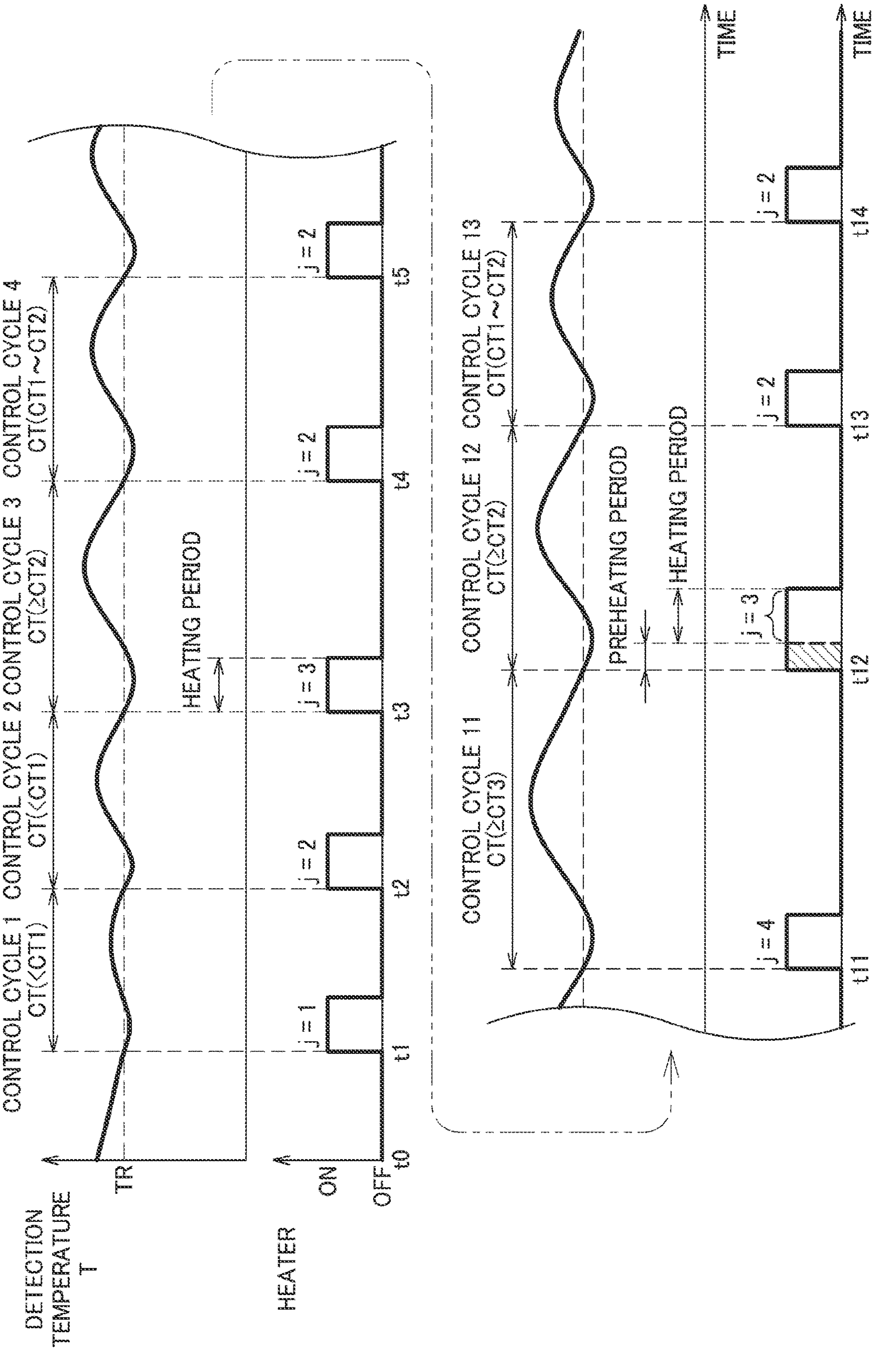
FIG. 12 is a time chart showing one example of heater operation and temperature fluctuation under standby control according to the third example.

According to this process, the energization amount during the heating period can also be adjusted by changing the duty ratio. For example, as shown in FIG. 12, the temperature of the fuser 8 can be maintained at temperatures around a target standby temperature TR by adjusting the heating intensity variable j with the heating period of the heater H1 in the control period being kept unchanged. In other words, similar to the first example, if the amount of heat supplied to the fuser 8 is not sufficient, the amount of supplied heat can be increased by increasing the output of the heater H1, and if the amount of heat supplied to the fuser 8 is too large, the amount of supplied heat can be reduced by decreasing the output of the heater H1. In this way, since an excessive amount of heat is not supplied to the fuser 8, the de-energization time period of the heater H1 can be kept from becoming too long. Although the period in which the heater H1 is turned on (heating period) is shown as a continuous period, the heater H1 is actually turned on and off repeatedly for short periods of time according to the duty ratio.

Next, a fourth example will be described. In this example, the same portions as those of the first example are identified by the same reference characters and explanation thereof is omitted. Only points different from those of the first example will be described in detail. In the first to third examples, when the temperature fluctuation period CT is long, a preheating period is provided just before the heating period to energize the heater H1 with a smaller power than that during the heating period in order to keep inrush current from becoming too large as a result of the temperature of the heater H1 decreasing and causing a resistance value of the heater H1 to decrease. Whereas, the fourth example restrains excessive inrush current by proactively keeping the temperature of the heater H1 from dropping. To be more specific, during temperature drop standby, if the detection temperature T is higher than the target standby temperature TR upon lapse of a second predetermined time period from start of the heating period, the controller 100 energizes the heater H1 with a third heating intensity during execution of temperature drop standby. In other words, when temperature drop standby in one control cycle continues for a long period, preheating is performed after the heating period of the one control cycle ends and before the detection temperature T drops to the target standby temperature TR. In this way, the temperature of the heater H1 increases which keeps the resistance value of the heater H1 from decreasing and thereby keeps inrush current from becoming too large upon start of energizing the heater H1 in the next control cycle. During preheating, the controller 100 energizes the heater H1 two times under wave number control at a duty ratio of 33% as an example of a third heating intensity. In other words, the controller 100 repeats twice the energization pattern shown in FIG. 4A in which one half wave of three half waves of the AC voltage is applied for energization.

Figure 13:
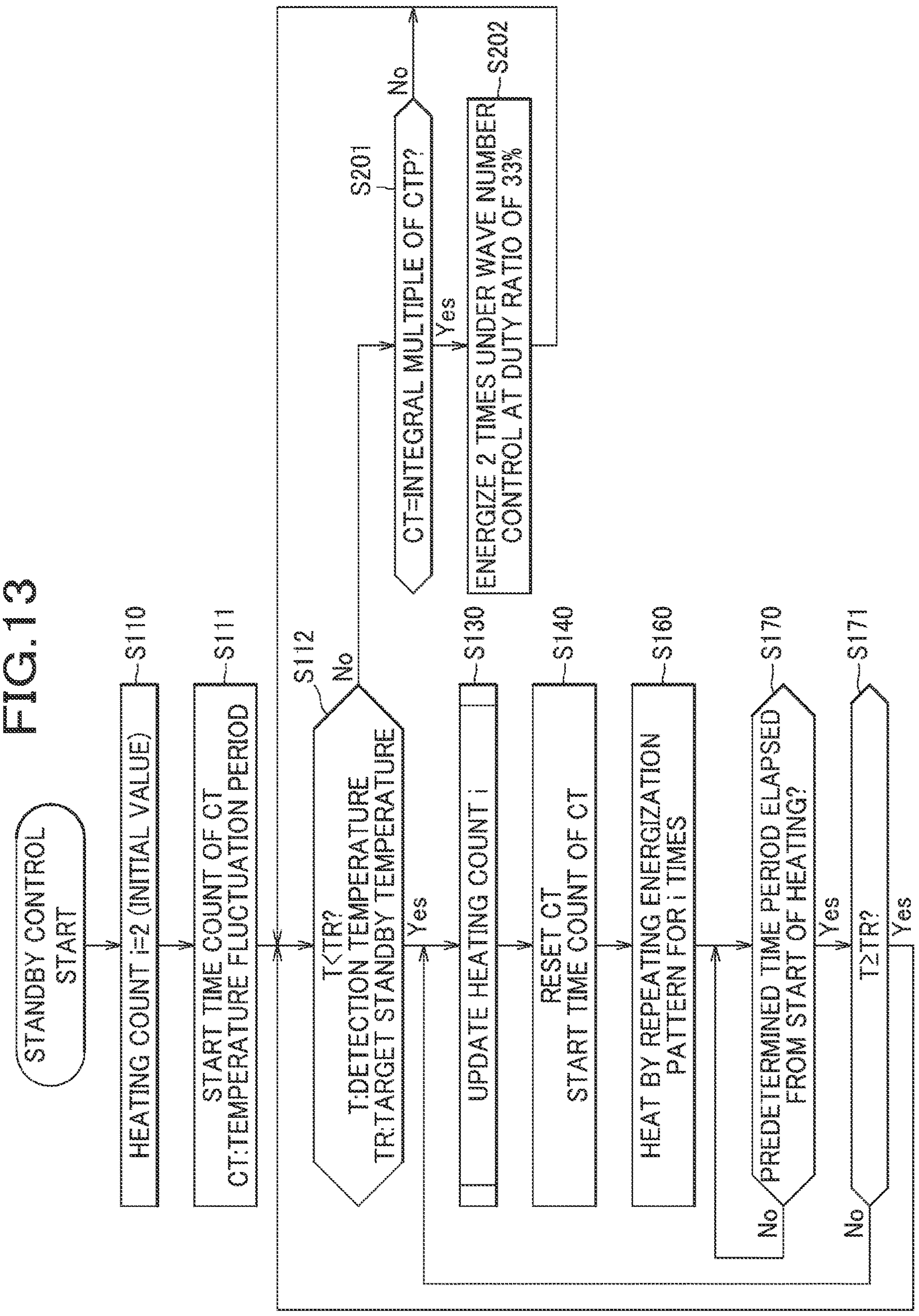
FIG. 13 is a flowchart of a standby control process according to a fourth example.

In the fourth example shown in FIG. 13, if determination in step S112 turns out to be No, the controller 100 determines whether the temperature fluctuation period CT is equal to an integral multiple of the second predetermined time period CTP (S201). If it is determined that the temperature fluctuation period CT is equal to the integral multiple of the second predetermined time period CTP (S201, Yes), the controller 100 energizes the heater H1 two times under wave number control at a duty ratio of 33% (S202). If it is determined in step 201 that the temperature fluctuation period CT is not equal to the integral multiple of the second predetermined time period CTP (S201, No), the controller 100 returns to step S112 without energizing the heater H1. The controller 100 also returns to step S112 after energizing the heater H1 in step S202. In the process of control of the present example, steps S150 and S151 of the first example (see FIG. 5) are not executed.

Figure 14:
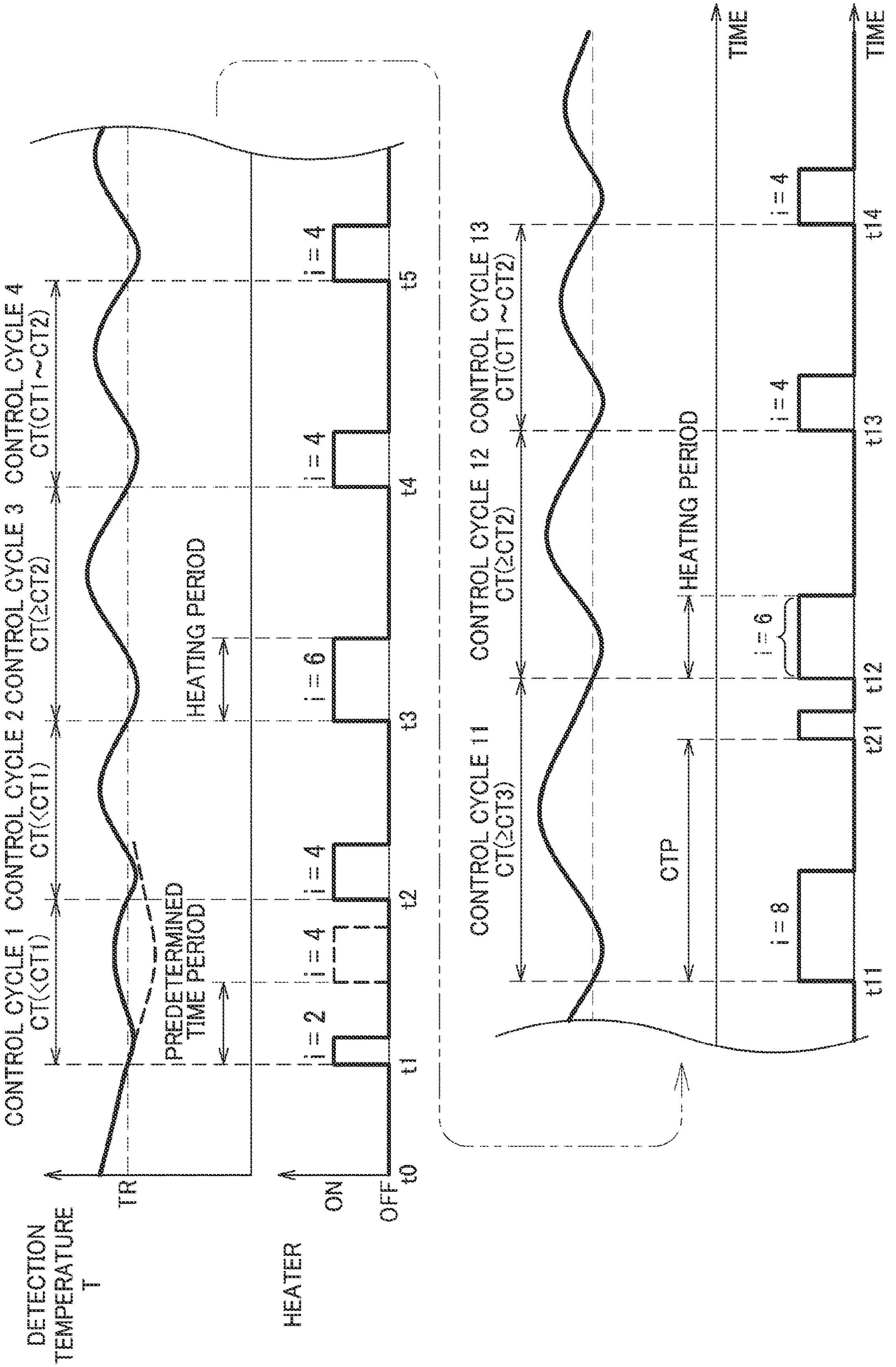
FIG. 14 is a time chart showing one example of heater operation and temperature fluctuation under standby control according to the fourth example.

According to the above-described control, if the temperature fluctuation period CT becomes longer due to excess heating in the heating period, and the detection temperature T does not drop to the target standby temperature TR even after the lapse of the second predetermined time period CTP, as shown in the control cycle 11 of FIG. 14, the heater H1 is preheated by energizing the heater H1 two times under wave number control at a duty ratio of 33% (t21). This preheating is performed each time the second predetermined time period CTP elapses until the detection temperature T drops to the target standby temperature TR. In this way, the temperature of the heater H1 is kept from dropping to an excessively low temperature before the next control cycle starts when the detection temperature T drops to the target standby temperature TR. This keeps inrush current from becoming too large upon starting energization to the heater H1 in the next control cycle. In this example, preheating is performed every time the second predetermined time period CTP elapses from start of the heating period. However, preheating may be performed only when the second predetermined time period CTP elapses from start of the heating period. Preheating may, for example, only be performed when it is determined that the temperature fluctuation period CT is equal to the second predetermined time period CTP in step 201. The criterion for determination in step S201 may be substituted with CT≥CTP. In this case, a flag indicating whether or not preheating has been performed may be provided so that preheating of step S202 is performed only once during one control cycle.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, although the heater is energized by an AC voltage in the above examples, the heater may be energized by a DC voltage. If the heater is energized by a DC voltage, the energization amount may be adjusted by duty control or by changing the voltage.

Although the rotation member of the heating member is not rotated during exercise of standby control in the above-described examples, the rotation member may be rotated during exercise of standby control.

Although an endless belt is given as an example of the rotation member in the above-described examples, the rotation member may be a roller. Further, although a pressure roller is given as an example of the pressure member in the above-described examples, the pressure member may be a pressure unit including an endless pressure belt.

Although the temperature sensor is provided to detect the temperature of the heating member in the above-described examples, the temperature sensor may be provided to detect a temperature of a portion of the fuser other than the heating member such as the pressure member. The temperature sensor may be a temperature sensor other than a thermistor. Further, the temperature sensor may be a non-contact-type temperature sensor or a contact-type temperature sensor.

Although a halogen heater which utilizes radiant heat is given as an example of the heater, the heater may be a ceramic heater or a carbon heater which utilizes heat produced by a resistor. Further, the heater may be positioned on the outside of the heating member rather than the inside of the heating member.

Although an image forming apparatus for forming a monochrome image on a sheet is given as an example of the image forming apparatus, the image forming apparatus may be a printer configured to form a color image on a sheet. Further, the image forming apparatus is not limited to a printer and may be, for example, a copy machine or a multifunction machine, comprising a document reader such as a flatbed scanner.

The elements described in the above example embodiments and its modified examples may be implemented selectively and in combination.

What is claimed is:

1. An image forming apparatus, comprising:

a toner image forming unit configured to form a toner image on a sheet;

a fuser comprising a heater and configured to fix the toner image onto the sheet;

a temperature sensor that detects a temperature of the fuser; and a controller configured to exercise a standby control under which the temperature of the fuser is maintained within desired limits at temperatures around a target standby temperature, based on a detection temperature detected by the temperature sensor, the standby control comprising:

repeating a control cycle that includes:

energizing the heater with an energization amount $E_n$ during a preset heating period in a case where the detection temperature has dropped to a temperature below the target standby temperature; and waiting until the detection temperature drops to the target standby temperature in a case where the detection temperature has risen to a temperature equal to or above the target standby temperature after the preset heating period has elapsed;

measuring a temperature fluctuation period that is a time period from start of energizing the heater to an end of the control cycle; and setting an energization amount $E_{n+1}$ for a next control cycle, based on the measured temperature fluctuation period, wherein:

in a case where the temperature fluctuation period of a last control cycle is shorter than a first threshold, the energization amount $E_{n+1}$ for the next control cycle is set at an amount greater than an energization amount $E_n$ for the last control cycle, in a case where the temperature fluctuation period of the last control cycle is equal to or longer than a second threshold greater than the first threshold, the energization amount $E_{n+1}$ for the next control cycle is set at an amount smaller than the energization amount $E_n$ for the last control cycle; and in a case where the temperature fluctuation period of the last control cycle is equal to or longer than the first threshold and shorter than the second threshold, the energization amount $E_{n+1}$ for the next control cycle is set at a same amount as the energization amount $E_n$ for the last control cycle.

2. The image forming apparatus according to claim 1, wherein the controller is configured to execute the standby control, after lapse of the heating period, in such a manner that in a case where the detection temperature upon lapse of a predetermined time period from start of the heating period is below the target standby temperature, energization to the heater is started for the next control cycle in which the energization amount $E_{n+1}$ is set at an amount greater than the energization amount $E_n$ for the last control cycle.

3. The image forming apparatus according to claim 1, wherein the controller is configured to:

change the heating period to a time period longer than the heating period of the last control cycle in a case where the energization amount is adjusted to a greater amount; and change the heating period to a time period shorter than the heating period of the last control cycle in a case where the energization amount is adjusted to a smaller amount.

4. The image forming apparatus according to claim 3, wherein the controller is configured to control energization to the heater during the heating period by a wave number control scheme, wherein the energization amount is adjusted by changing the number of times of repeating a predetermined energization pattern of the wave number control scheme.

5. The image forming apparatus according to claim 1, wherein the controller is configured to provide a preheating period before the heating period of the next control cycle, in a case where the temperature fluctuation period of the last control cycle is equal to or longer than a third threshold greater than the second threshold, wherein the heater is energized during the preheating period with a first heating intensity smaller than a heating intensity with which the heater is energized in the heating period of the last control cycle, and then energized during the heating period with a second heating intensity greater than the first heating intensity.

6. The image forming apparatus according to claim 5, wherein the controller is configured to:

control energization to the heater during the heating period by a wave number control scheme; and control energization to the heater during the preheating period by a phase control scheme.

7. The image forming apparatus according to claim 1, wherein the controller is configured to energize the heater during the heating period at a preset duty ratio, wherein in a case where the energization amount is adjusted to a greater amount, the duty ratio is adjusted to a ratio above a duty ratio for the heating period of the last control cycle, and in a case where the energization amount is adjusted to a smaller amount, the duty ratio is adjusted to a ratio below the duty ratio for the heating period of the last control cycle.

8. The image forming apparatus according to claim 1, wherein the controller sets an initial energization amount for the heating period of the control cycle at a minimum permissible amount in a case where standby control is started for the first time after power to the image forming apparatus is turned on.

9. The image forming apparatus according to claim 1, wherein in a case where the temperature fluctuation period of the last control cycle is shorter than the first threshold, the controller sets an amount of adjustment for the energization amount $E_{n+1}-E_n$ in such a manner that the shorter the temperature fluctuation period, the greater the amount of adjustment for the energization amount $E_{n+1}-E_n$.

10. The image forming apparatus according to claim 1, wherein the fuser comprises:

a heating member configured to be heated by the heater, the heating member comprising a rotation member capable of rotating around the heater; and a pressure member configured to nip the sheet in combination with the heating member, wherein the controller is configured to:

cause the rotation member to rotate in a case where the toner image is fixed onto the sheet by the fuser; and prohibit the rotation member from rotating during standby control.

11. The image forming apparatus according to claim 1, wherein the controller is configured to exercise printing control under which energization to the heater is controlled to adjust the detection temperature to a target fixing temperature in a case where the toner image is fixed onto the sheet by the fuser, and wherein the target standby temperature is below the target fixing temperature.

12. The image forming apparatus according to claim 1, wherein the controller is configured to energize the heater with a third heating intensity during a temperature drop standby period in which the controller waits until the detection temperature drops to the target standby temperature after the detection temperature becomes equal to or above the target standby temperature subsequent to lapse of the heating period, in a case where the detection temperature is above the target standby temperature upon lapse of a second predetermined time period from start of the heating period.

13. The image forming apparatus according to claim 12, wherein the controller is configured to energize the heater with the third heating intensity by a wave number control scheme at a duty ratio of 33%.

14. A control method for an image forming apparatus, the image forming apparatus comprising:

a toner image forming unit configured to form a toner image on a sheet, a fuser comprising a heater and configured to fix the toner image onto the sheet; and a controller configured to exercise a standby control under which a temperature of the fuser is maintained within desired limits at temperatures around a target standby temperature, the standby control comprising:

repeating a control cycle that includes:

energizing the heater with an energization amount $E_n$ during a preset heating period in a case where the temperature of the fuser has dropped to a temperature below the target standby temperature; and waiting until the temperature of the fuser drops to the target standby temperature in a case where the temperature of the fuser has risen to a temperature equal to or above the target standby temperature after the preset heating period has elapsed;

measuring a temperature fluctuation period that is a time period from start of energizing the heater to an end of the control cycle; and setting an energization amount $E_{n+1}$ for a next control cycle, based on the measured temperature fluctuation period, wherein:

in a case where the temperature fluctuation period of a last control cycle is shorter than a first threshold, the energization amount $E_{n+1}$ for the next control cycle is set at an amount greater than an energization amount $E_n$ for the last control cycle, in a case where the temperature fluctuation period of the last control cycle is equal to or longer than a second threshold greater than the first threshold, the energization amount $E_{n+1}$ for the next control cycle is set at an amount smaller than the energization amount $E_n$ for the last control cycle; and in a case where the temperature fluctuation period of the last control cycle is equal to or longer than the first threshold and shorter than the second threshold, the energization amount $E_{n+1}$ for the next control cycle is set at a same amount as the energization amount $E_n$ for the last control cycle.

15. The control method according to claim 14, wherein the controller is configured to execute the standby control, after lapse of the heating period, in such a manner that in a case where the temperature of the fuser upon lapse of a predetermined time period from start of the heating period is below the target standby temperature, energization to the heater is started for the next control cycle in which the energization amount $E_{n+1}$ is set at an amount greater than the energization amount $E_n$ for the last control cycle.

16. The control method according to claim 14, wherein the controller is configured to:

change the heating period to a time period longer than the heating period of the last control cycle in a case where the energization amount is adjusted to a greater amount; and change the heating period to a time period shorter than the heating period of the last control cycle in a case where the energization amount is adjusted to a smaller amount.

17. The control method according to claim 16, wherein the controller is configured to control energization to the heater during the heating period by a wave number control scheme wherein the energization amount is adjusted by changing the number of times of repeating a predetermined energization pattern of the wave number control scheme.

18. The control method according to claim 14, wherein the controller is configured to provide a preheating period before the heating period of the next control cycle, in a case where the temperature fluctuation period of the last control cycle is equal to or longer than a third threshold greater than the second threshold, wherein the heater is energized during the preheating period with a first heating intensity smaller than a heating intensity with which the heater is energized in the heating period of the last control cycle, and then energized during the heating period with a second heating intensity greater than the first heating intensity.

19. The control method according to claim 18, wherein the controller is configured to:

control energization to the heater during the heating period under a wave number control scheme; and control energization to the heater during the preheating period under a phase control scheme.

20. The control method according to claim 14, wherein the controller is configured to energize the heater during the heating period at a preset duty ratio wherein in a case where the energization amount is adjusted to a greater amount, the duty ratio is adjusted to a ratio above a duty ratio for the heating period of the last control cycle, and in a case where the energization amount is adjusted to a smaller amount, the duty ratio is adjusted to a ratio below the duty ratio for the heating period of the last control cycle.

* * * * *